US011945405B2

(12) United States Patent
Chen et al.

(10) Patent No.: US 11,945,405 B2
(45) Date of Patent: Apr. 2, 2024

(54) EXTENDABLE AND RETRACTABLE VEHICLE STEP

(71) Applicant: WINBO-DONGJIAN AUTOMOTIVE TECHNOLOGY CO., LTD., Foshan (CN)

(72) Inventors: Yongbo Chen, Foshan (CN); Peiquan Lai, Foshan (CN); Yongxin Liang, Foshan (CN); Jie Yang, Foshan (CN)

(73) Assignee: WINBO-Dongjian Automotive Technology Co., Ltd., Guangdong (CN)

( * ) Notice: Subject to any disclaimer, the term of this patent is extended or adjusted under 35 U.S.C. 154(b) by 0 days.

(21) Appl. No.: 18/221,953

(22) Filed: Jul. 14, 2023

(65) Prior Publication Data
US 2023/0356659 A1  Nov. 9, 2023

Related U.S. Application Data

(63) Continuation-in-part of application No. 17/889,408, filed on Aug. 17, 2022, which is a continuation-in-part of application No. PCT/CN2021/133818, filed on Nov. 29, 2021.

(30) Foreign Application Priority Data

Nov. 15, 2021 (CN) .......................... 202111351509.7

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| 1,129,956 | A | * | 3/1915 | Chapman | .................. | B60R 3/02 |
| | | | | | | 105/449 |
| 3,387,906 | A | * | 6/1968 | Edwards | .............. | A47B 88/487 |
| | | | | | | 312/334.25 |
| 4,073,502 | A | | 2/1978 | Frank et al. | | |
| 6,641,158 | B2 | | 11/2003 | Leitner | | |
| 6,830,257 | B2 | | 12/2004 | Leitner | | |
| 6,834,875 | B2 | | 12/2004 | Leitner et al. | | |
| 6,938,909 | B2 | | 9/2005 | Leitner | | |
| 6,942,233 | B2 | | 9/2005 | Leitner et al. | | |
| 6,955,370 | B2 | | 10/2005 | Fabiano et al. | | |
| 7,007,961 | B2 | | 3/2006 | Leitner et al. | | |
| 7,017,927 | B2 | | 3/2006 | Henderson et al. | | |

(Continued)

FOREIGN PATENT DOCUMENTS

EP    1445151 A1    8/2004

*Primary Examiner* — Bryan A Evans
(74) *Attorney, Agent, or Firm* — Banner & Witcoff, Ltd.

(57) ABSTRACT

An extendable and a retractable vehicle step may comprise one or more assemblies. An assembly may comprise a first support arm pivotably coupled to a second support arm for extending and retracting a vehicle step. The second support arm may pass through a sleeve that may support and/or guide the second support arm. The sleeve may be rotatable and/or may comprise one or more rollers that may facilitate movement of the second support arm.

28 Claims, 20 Drawing Sheets

(56) References Cited

U.S. PATENT DOCUMENTS

| | | | |
|---|---|---|---|
| 7,055,839 B2 | 6/2006 | Leitner |
| 7,118,120 B2 | 10/2006 | Lee et al. |
| 7,287,771 B2 | 10/2007 | Lee et al. |
| 7,311,320 B2 | 12/2007 | Kuntze et al. |
| 7,318,596 B2 | 1/2008 | Scheuring, III et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,441,790 B2 | 10/2008 | Lechkun |
| 7,469,916 B2 | 12/2008 | Watson |
| 7,487,986 B2 | 2/2009 | Leitner et al. |
| 7,513,565 B2 | 4/2009 | Watson |
| 7,566,064 B2 | 7/2009 | Leitner et al. |
| 7,584,975 B2 | 9/2009 | Leitner |
| 7,594,672 B2 | 9/2009 | Piotrowski |
| 7,607,674 B2 | 10/2009 | Watson |
| 7,621,546 B2 | 11/2009 | Ross et al. |
| 7,637,519 B2 | 12/2009 | Leitner et al. |
| 7,677,583 B2 | 3/2010 | Armstrong et al. |
| 7,712,755 B2 | 5/2010 | Yang et al. |
| 7,823,896 B2 | 11/2010 | VanBelle et al. |
| 7,896,374 B2 | 3/2011 | Kuntze et al. |
| 7,976,042 B2 | 7/2011 | Watson et al. |
| 8,042,821 B2 | 10/2011 | Yang et al. |
| 8,052,162 B2 | 11/2011 | Yang et al. |
| 8,136,826 B2 | 3/2012 | Watson |
| 8,157,277 B2 | 4/2012 | Leitner et al. |
| 8,205,901 B2 | 6/2012 | Yang et al. |
| 8,342,551 B2 | 1/2013 | Watson |
| 8,382,132 B2 | 2/2013 | Kowalski |
| 8,408,571 B2 | 4/2013 | Leitner et al. |
| 8,469,380 B2 | 6/2013 | Yang et al. |
| 8,714,575 B2 | 5/2014 | Watson |
| 8,833,781 B2 | 9/2014 | Hayes |
| 8,833,782 B2 | 9/2014 | Huotari et al. |
| 8,844,957 B2 | 9/2014 | Leitner et al. |
| 8,939,456 B2 | 1/2015 | Shelswell et al. |
| 9,205,781 B1 | 12/2015 | May |
| 9,272,667 B2 | 3/2016 | Smith |
| 9,302,626 B2 | 4/2016 | Leitner et al. |
| 9,308,870 B2 | 4/2016 | Yang et al. |
| 9,511,717 B2 | 12/2016 | Smith |
| 9,522,634 B1 | 12/2016 | Smith |
| 9,527,449 B2 | 12/2016 | Smith |
| 9,561,751 B2 | 2/2017 | Leitner et al. |
| 9,573,467 B2 | 2/2017 | Chen et al. |
| 9,649,983 B2 | 5/2017 | Watson |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,771,024 B2 | 9/2017 | Hayes et al. |
| 9,834,147 B2 | 12/2017 | Smith |
| 9,896,033 B2 | 2/2018 | Chen et al. |
| 9,944,231 B2 | 4/2018 | Leitner et al. |
| 10,053,017 B2 | 8/2018 | Leitner et al. |
| 10,059,268 B2 | 8/2018 | Hayes et al. |
| 10,077,002 B2 | 9/2018 | Okuyama |
| 10,077,016 B2 | 9/2018 | Smith et al. |
| 10,106,088 B2 | 10/2018 | Smith |
| 10,118,557 B2 | 11/2018 | Pribisic |
| 10,124,735 B2 | 11/2018 | Du et al. |
| 10,183,624 B2 | 1/2019 | Leitner et al. |
| 10,195,997 B2 | 2/2019 | Smith |
| 10,272,842 B2 | 4/2019 | Du et al. |
| 10,322,676 B2 | 6/2019 | Yang et al. |
| 10,322,677 B1 | 6/2019 | Leitner et al. |
| 10,343,610 B2 | 7/2019 | Long et al. |
| 10,384,614 B1 | 8/2019 | Du et al. |
| 10,399,500 B2 | 9/2019 | Hayes |
| 10,479,278 B2 | 11/2019 | Du et al. |
| 10,513,224 B2 | 12/2019 | Smith |
| 10,538,204 B2 | 1/2020 | Long et al. |
| 10,596,971 B2 | 3/2020 | Leitner et al. |
| 10,618,472 B2 | 4/2020 | Du et al. |
| 10,654,418 B2 | 5/2020 | He et al. |
| 10,682,960 B2 | 6/2020 | Du et al. |
| 10,759,349 B2 | 9/2020 | Leitner |
| 10,766,424 B2 | 9/2020 | Stickles et al. |
| 10,773,649 B2 | 9/2020 | Ye |
| 10,773,670 B2 | 9/2020 | Smith et al. |
| 10,821,904 B2 | 11/2020 | Du et al. |
| 10,913,397 B2 | 2/2021 | Pribisic |
| 10,919,453 B2 | 2/2021 | Watson |
| 11,021,108 B2 | 6/2021 | Du et al. |
| 11,077,802 B2 | 8/2021 | Long et al. |
| 11,180,100 B2 | 11/2021 | Smith et al. |
| 11,198,394 B2 | 12/2021 | Du et al. |
| 11,198,395 B2 | 12/2021 | Smith |
| 11,208,043 B2 | 12/2021 | Du et al. |
| 11,208,044 B2 | 12/2021 | Smith et al. |
| 11,279,290 B2 | 3/2022 | Leitner |
| 11,292,390 B2 | 4/2022 | Du et al. |
| 11,318,889 B2 | 5/2022 | Du et al. |
| 11,338,737 B2 | 5/2022 | Godfrey |
| 11,408,215 B2 | 8/2022 | Lindberg et al. |
| 11,414,017 B2 | 8/2022 | Qing et al. |
| 11,420,563 B2 | 8/2022 | Luo et al. |
| 11,458,900 B2 | 10/2022 | Watson |
| 11,505,128 B2 | 11/2022 | Du et al. |
| 11,524,632 B2 | 12/2022 | Pantea et al. |
| 11,541,816 B2 | 1/2023 | Watson |
| 11,577,653 B2 | 2/2023 | Qing et al. |
| 11,577,654 B2 | 2/2023 | Du et al. |
| 11,584,387 B2 | 2/2023 | Du et al. |
| 11,590,897 B2 | 2/2023 | Qing et al. |
| 11,624,411 B2 | 4/2023 | Lindberg et al. |
| 2008/0191445 A1 | 8/2008 | Yang et al. |
| 2009/0295114 A1 | 12/2009 | Yang et al. |
| 2009/0295115 A1 | 12/2009 | Yang et al. |
| 2010/0140897 A1 | 6/2010 | Yang et al. |
| 2010/0320714 A1* | 12/2010 | Webb ................ B61D 23/025 |
| | | 280/166 |
| 2012/0025485 A1 | 2/2012 | Yang et al. |
| 2015/0274079 A1 | 10/2015 | Yang et al. |
| 2016/0039346 A1 | 2/2016 | Yang et al. |
| 2016/0089975 A1 | 3/2016 | Chen et al. |
| 2016/0288718 A1 | 10/2016 | Hayes et al. |
| 2016/0347253 A1 | 12/2016 | Du et al. |
| 2017/0021781 A1 | 1/2017 | Du et al. |
| 2017/0036605 A1 | 2/2017 | Du et al. |
| 2017/0036606 A1 | 2/2017 | Du et al. |
| 2017/0036607 A1 | 2/2017 | Du et al. |
| 2017/0036608 A1 | 2/2017 | Du et al. |
| 2017/0158140 A1 | 6/2017 | Chen et al. |
| 2018/0009385 A1 | 1/2018 | Hayes et al. |
| 2018/0257572 A1 | 9/2018 | Du et al. |
| 2018/0339657 A1 | 11/2018 | He et al. |
| 2019/0054860 A1 | 2/2019 | Yang et al. |
| 2019/0126834 A1 | 5/2019 | Hayes |
| 2019/0329711 A1 | 10/2019 | Du et al. |
| 2020/0023779 A1 | 1/2020 | Du et al. |
| 2020/0023780 A1* | 1/2020 | Du ..................... B60R 3/002 |
| 2020/0047674 A1 | 2/2020 | Du et al. |
| 2020/0262354 A1 | 8/2020 | Du et al. |
| 2020/0269763 A1 | 8/2020 | Du et al. |
| 2020/0282913 A1 | 9/2020 | Qing et al. |
| 2020/0282914 A1 | 9/2020 | Du et al. |
| 2020/0331396 A1 | 10/2020 | Du et al. |
| 2021/0078591 A1 | 3/2021 | Du et al. |
| 2021/0213885 A1 | 7/2021 | Du et al. |
| 2021/0309153 A1 | 10/2021 | Luo et al. |
| 2021/0347303 A1 | 11/2021 | Qing et al. |
| 2021/0347304 A1 | 11/2021 | Qing et al. |
| 2021/0402928 A9 | 12/2021 | Du et al. |
| 2022/0194299 A1 | 6/2022 | Du et al. |
| 2022/0219612 A1 | 7/2022 | Du et al. |
| 2022/0371517 A1 | 11/2022 | Du et al. |
| 2023/0088553 A1 | 3/2023 | Du et al. |
| 2023/0133412 A1 | 5/2023 | Yang et al. |
| 2023/0150436 A1 | 5/2023 | Lai et al. |

* cited by examiner

EXTENDABLE AND RETRACTABLE VEHICLE STEP

CROSS REFERENCE TO RELATED APPLICATIONS

The present application is a continuation-in-part of U.S. patent application Ser. No. 17/889,408 filed on Aug. 17, 2022, which is a continuation-in-part of PCT Application No. PCT/CN2021/133818 filed on Nov. 29, 2021, which claims the benefit of Chinese Patent Application No. 202111351509.7 filed on Nov. 15, 2021. All the above are hereby incorporated by reference in their entirety.

TECHNICAL FIELD

The present disclosure relates to a technical field of vehicle accessories, and in particular to extendable and retractable vehicle steps, rocker footboard device(s), assemblies thereof, and/or a vehicle including one or more such step(s), device(s), and/or assemblies.

BACKGROUND

A vehicle footboard is provided under a vehicle door to facilitate a person entering and exiting the vehicle. There have been two types of mainstream footboards, including a fixed footboard (namely the position of the footboard on a vehicle is fixed), and an electric lifting footboard (namely the footboard is extended under driving of a motor when needed, but retracted and concealed under the vehicle door when not used). Existing electric footboards are extended or retracted by driving a four-axes or four-rod linkage mechanism using a motor, such as described in U.S. Pat. No. 6,641,158. However, such a four-rod linkage mechanism has disadvantages such as a relatively high manufacturing cost, limited extension/retraction range, susceptibility to failure after repeated use, and/or lack of compatibility with various vehicle manufacturers and/or vehicle models.

SUMMARY

The following presents a summary in order to provide a general understanding of various aspects of the disclosure. The summary is not an exhaustive overview of the disclosure and is not intended to limit the scope of any inventive concepts described herein. An objective of the present disclosure provides extendable and retractable vehicle steps and/or a rocker footboard devices to solve problems such as high manufacturing cost, limited travel of an extending and retracting mechanism and/or other disadvantages of vehicle steps and/or rocker footboard devices such as identified above and/or described herein.

To achieve the above objectives, a first aspect of the present disclosure provides a rocker footboard device, including: a mounting seat, a rotary driving device arranged on the mounting seat, a first connecting rod, a second connecting rod, a sliding sleeve, and a footboard, where the rotary driving device is provided with a driving shaft; the first connecting rod includes a first end fixedly connected with the driving shaft, and a second end pivotally connected with a first end of the second connecting rod through a first pivot shaft; the footboard is provided at a second end of the second connecting rod; the sliding sleeve is pivotally connected with the mounting seat through a second pivot shaft; a middle segment of the second connecting rod is slidably provided on the sliding sleeve; and an axis of the driving shaft, an axis of the first pivot shaft, and an axis of the second pivot shaft are parallel to one another.

Preferably, a distance between the axis of the driving shaft and the axis of the first pivot shaft may be a first distance; a distance between the axis of the driving shaft and the axis of the second pivot shaft may be a second distance; and the first distance may be less than the second distance. Preferably, the rotary driving device may be provided at an underside of the mounting seat, the underside of the mounting seat may be provided with a hinge seat, the second pivot shaft may be pivotally connected on the hinge seat, and the driving shaft may be higher than the second pivot shaft. Preferably, the rocker footboard device may further include: a stop block, where the stop block may be located between the driving shaft and the second pivot shaft, an upper end of the stop block may be connected with the mounting seat, and a lower side of the stop block may be provided with an abutting portion abutting against the second connecting rod. Preferably, the abutting portion may be provided with an abutting surface abutting against the second connecting rod, and the abutting surface may be matched with an outer side of the second connecting rod in shape. Preferably, when the second connecting rod abuts against the abutting surface, the second end of the second connecting rod may be extended, and an upper side of the footboard may keep horizontal. Preferably, the mounting seat may be provided with a plurality of mounting holes. Preferably, the second end of the second connecting rod may be provided with a bending portion which may bend upward, and the footboard may be provided on the bending portion. Preferably, a friction texture may be provided at the upper side of the footboard.

A second aspect of the present disclosure provides a vehicle, including: a vehicle body, and the above rocker footboard device, where the vehicle body is provided with a chassis; the mounting seat is provided at a bottom of the chassis; and the rotary driving device, the first connecting rod, and the second connecting rod are located under the chassis.

The rocker footboard device and the vehicle including same provided by the present disclosure achieve the following beneficial effects: The rotary driving device of the rocker footboard device drives the first connecting rod to rotate around the driving shaft, and the first connecting rod drives the second connecting rod to slide in the sliding sleeve. As a result, the second connecting rod is extended or retracted, thereby extending the footboard when the footboard is needed, or retracting the footboard when the footboard is not used. Compared with the four-rod linkage mechanism, the rocker footboard device has the simpler structure, fewer parts, smaller size, lower manufacturing cost, and higher production efficiency. Moreover, under a same occupied space, the crank rocker mechanism formed by the first connecting rod, the second connecting rod and the sliding sleeve has larger travel, allowing for greater convenience in adjusting the travel of the footboard, and a stronger universality.

A third aspect of the present disclosure provides an extendable and a retractable vehicle step using a rotatable sleeve. Examples described herein provide a footboard connected to a pair of dual support members (or first and second support arms). Each dual support member may comprise a first support arm and a second support arm, pivotally coupled at a joint, such as by a pin. The first support arm may be substantially shorter than (e.g., approximately half the length of) the second support arm. The first support arm may be pivotably coupled to a frame, such as by a pin or joint at a first end opposite from a second end that may comprise the pivotably coupled joint with the second support arm. The second support arm may be configured to pass through a rotatable sleeve. The rotatable sleeve may provide a mechanism to support and/or guide the second connecting arm. The rotatable sleeve may be configured to rotate during extension and/or retraction of the vehicle step. The rotatable sleeve may be configured to initially rotate clockwise during extension of the vehicle step, and to subsequently rotate counter-clockwise during continued extension of the vehicle step. Similarly, the rotatable sleeve may be configured to initially rotate clockwise during retraction of the vehicle step, and to subsequently rotate counter-clockwise during continued retraction of the vehicle step. As described further herein, an extendable and a retractable vehicle step using a rotatable sleeve may provide advantages such as increased range of extension and/or retraction, enhanced stability, improved durability, and greater compatibility with various vehicle manufacturers and/or vehicle models, as well as other advantages that will be evident from the disclosure herein.

A fourth aspect of the present disclosure provides an extendable and a retractable vehicle step using one or more rollers and/or guide paths. Examples described herein provide a footboard connected to a pair of dual support members (or first and second support arms). Each dual support member may comprise a first support arm and a second support arm, pivotably coupled at a joint, such as by a pin or a joint. The first support arm may be substantially shorter than (e.g., approximately half the length of) the second support arm. The first support arm may be pivotably coupled to a frame, such as by a pin or a joint at a first end opposite from a second end that may comprise the pivotably coupled joint with the second support arm. The second support arm may be configured to pass through a sleeve. The sleeve may provide a mechanism to support and/or guide the second support arm. The sleeve may be configured with one or more rollers that may rotate during extension and/or retraction of the vehicle step. The second support arm may be configured with one or more guide paths. The one or more guide paths may comprise a first guide path that may comprise a cavity adapted for a first roller, such as on an underside of the second support arm. The first roller may be coupled to and/or part of the sleeve. The first roller may be configured to support the second support arm. The one or more guide paths may comprise a second guide path that may comprise a raised portion adapted for a second roller, such as on the top side of the second support arm. The second roller may be configured to restrict movement of the second support arm in a primarily vertical direction. The second guide path may comprise a ramp and/or stop portion at a first end and/or at a second end of the raised portion that may respectively restrict extension and/or retraction up to a configured stopping position. As described further herein, an extendable and a retractable vehicle step using one or more rollers and/or guide paths may provide advantages such as increased range of extension and/or retraction, enhanced stability, improved durability, and greater compatibility with various vehicle manufacturers and/or vehicle models, as well as other advantages that will be evident from the disclosure herein.

Additional aspects and advantages of the present disclosure will be partly provided in the following description, and partly become evident in the following description or understood through the practice of the present disclosure. The above features, along with many others, are described in greater detail below.

BRIEF DESCRIPTION OF THE DRAWINGS

The present disclosure is shown by way of example figures, listed below, in which like reference numerals indicate similar elements.

100: mounting seat, 110: hinge seat, 120: stop block, 121: abutting portion, 122: abutting surface, 130: mounting hole, 200: rotary driving device, 210: driving shaft, 300: first connecting rod, 310: first pivot shaft, 400: second connecting rod, 410: bending portion, 500: sliding sleeve, 510: second pivot shaft, 600: footboard, 610: friction texture, 700: first distance, 800: second distance, 16: vehicle body, and 17: chassis.

Figure 5:
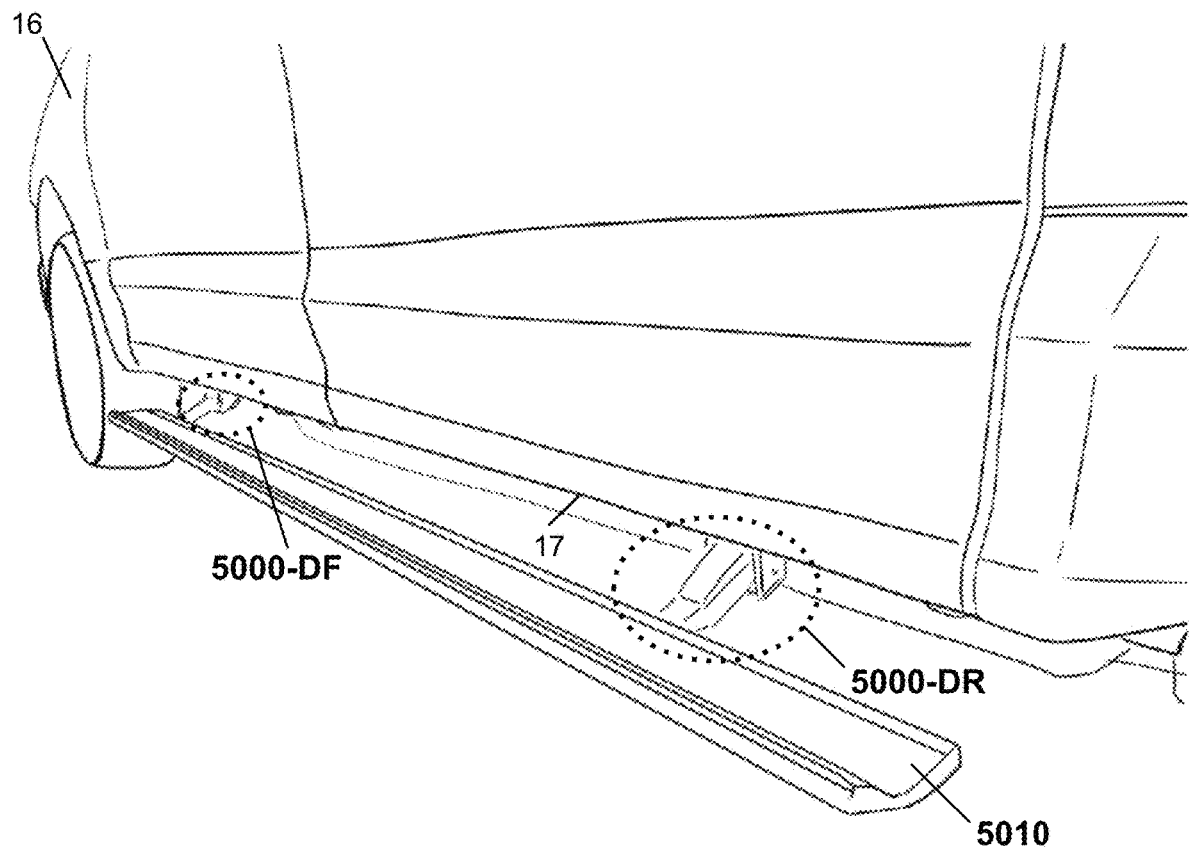

FIG. 5 shows an example of a pair of rocker footboard devices coupled to a footboard and mounted to a vehicle.

Figure 6:
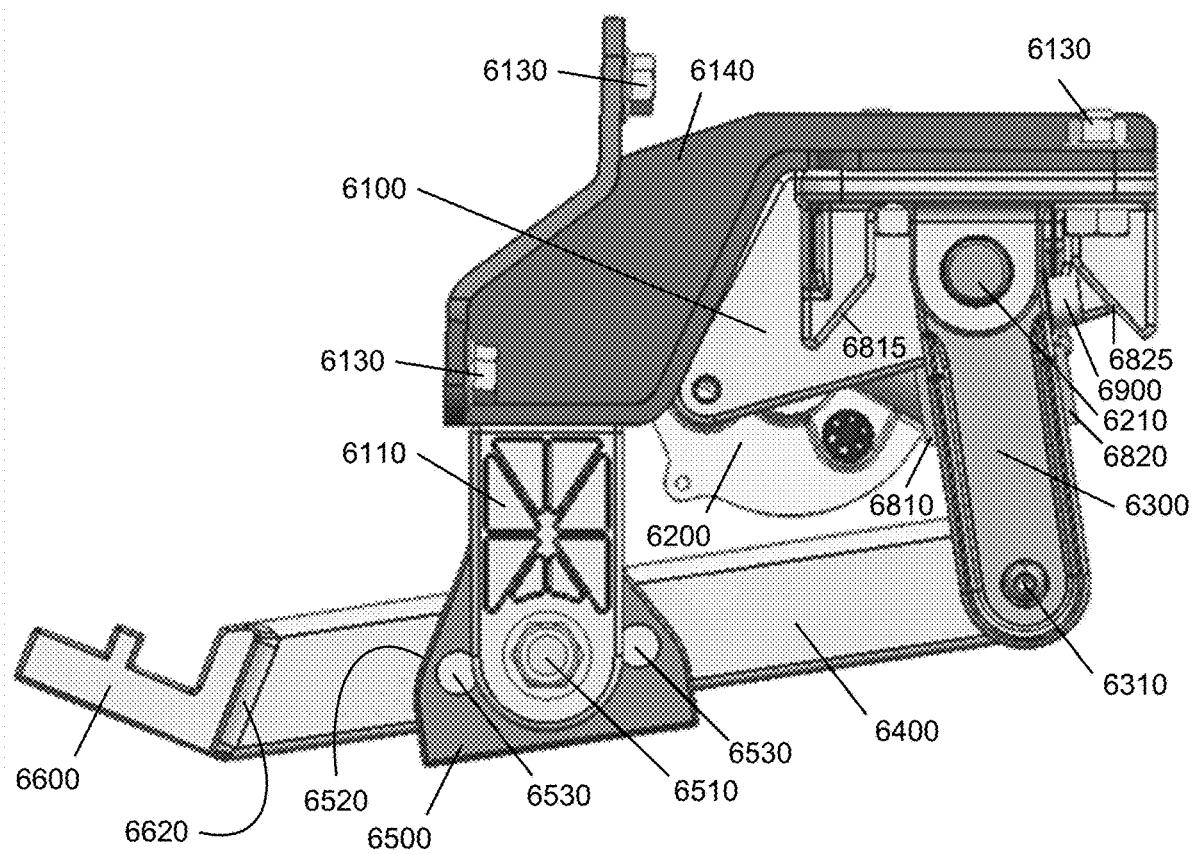

FIG. 6 shows an example of a side view of an assembly for an extendable and a retractable vehicle step, wherein the assembly comprises a rotatable sleeve.

Figure 7:
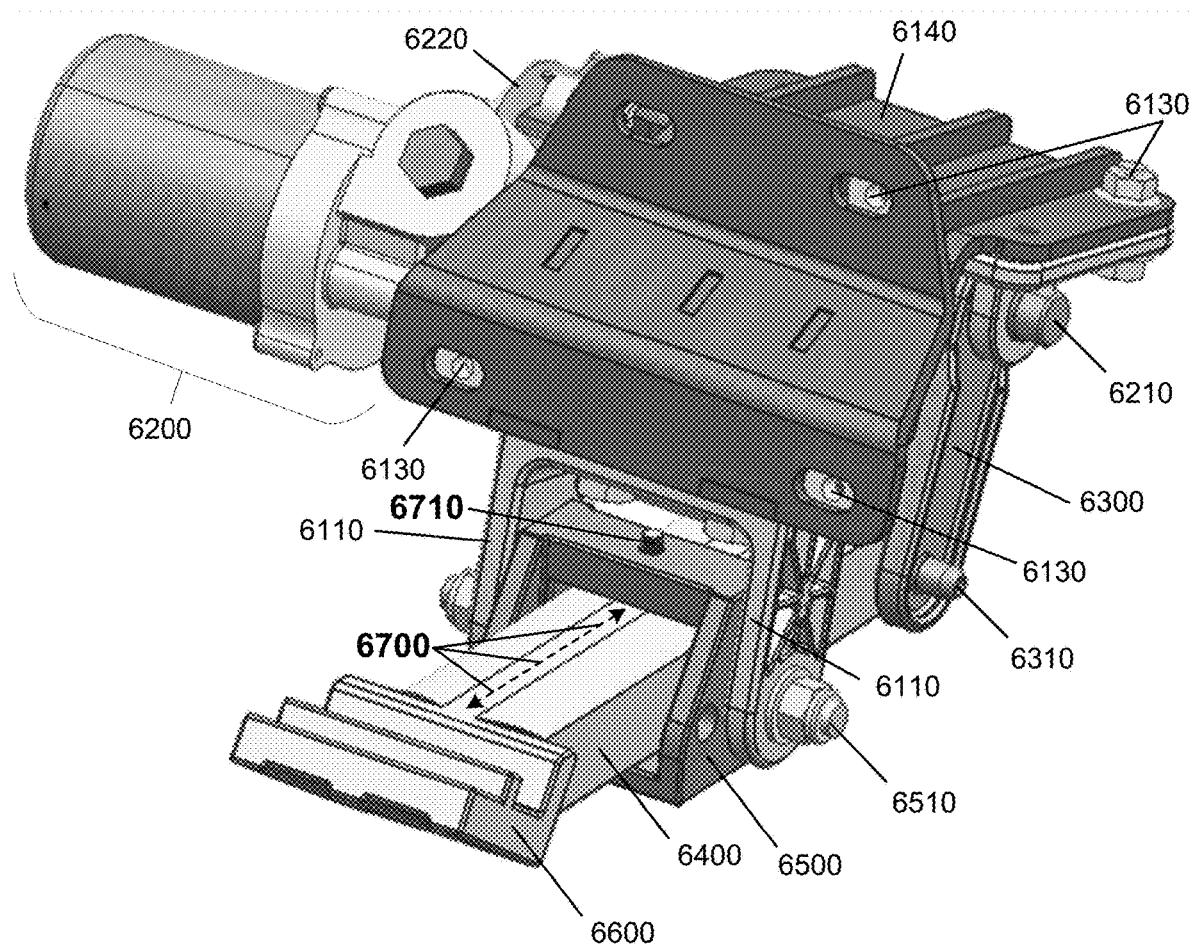

FIG. 7 shows an example of an angled top view of an assembly for an extendable and a retractable vehicle step, wherein the assembly comprises a rotatable sleeve.

Figure 8:
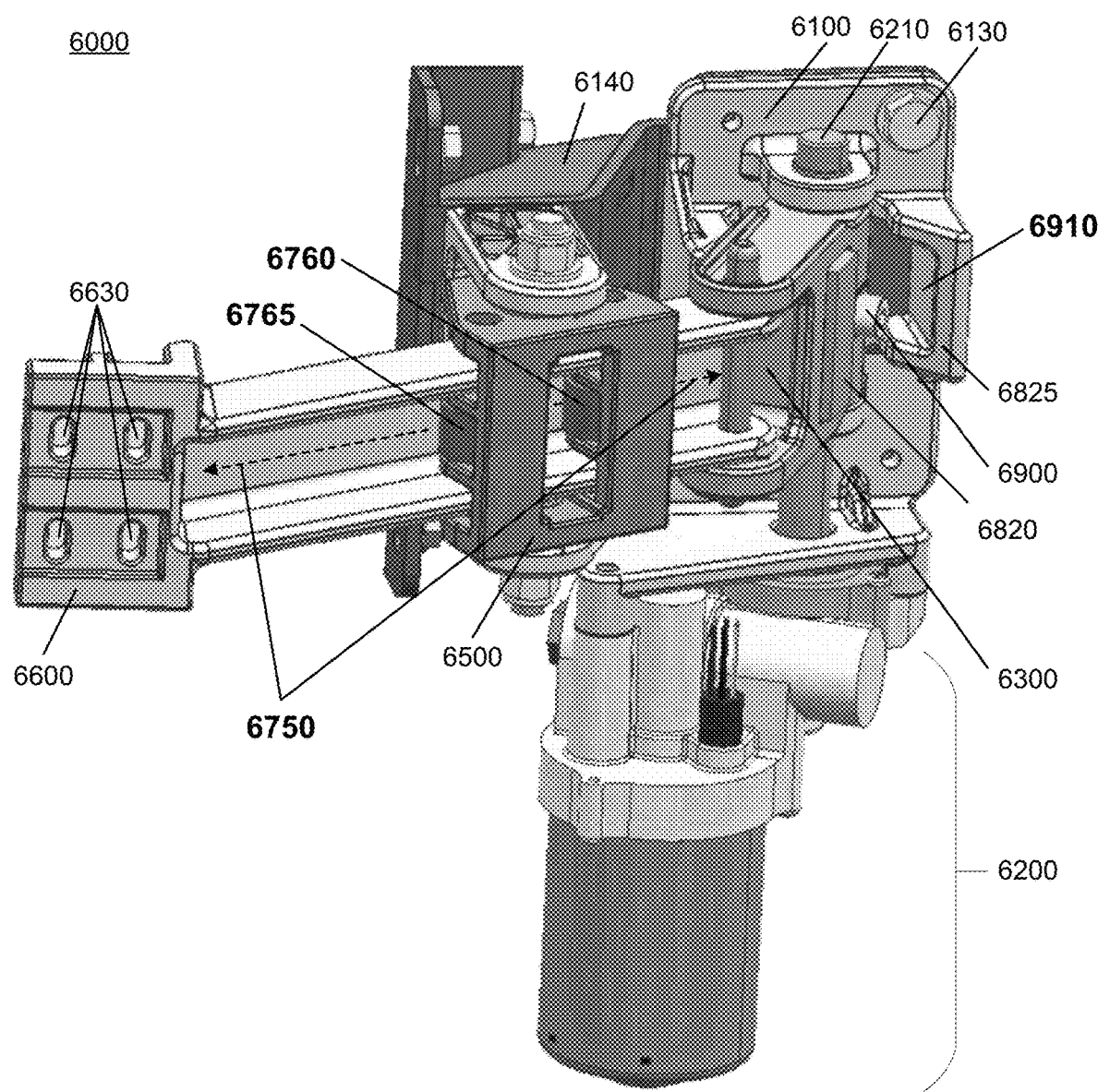

FIG. 8 shows an example of an angled bottom view of an assembly for an extendable and a retractable vehicle step, wherein the assembly comprises a rotatable sleeve.

Figure 9:
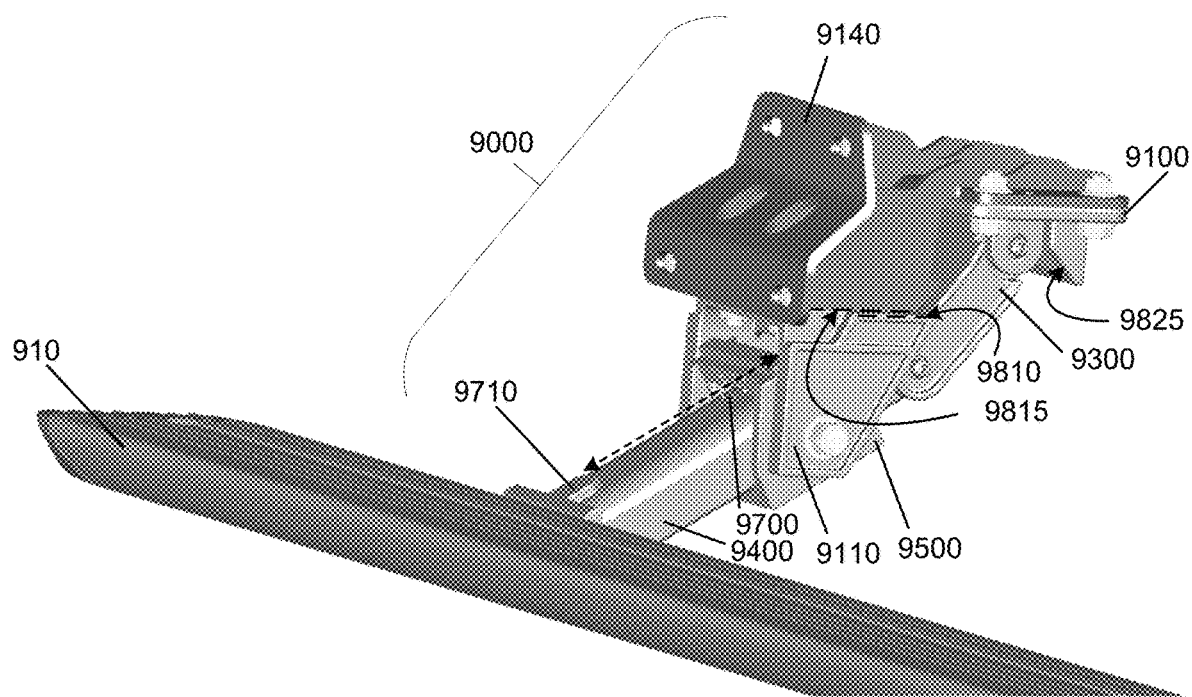

FIG. 9 shows an example of an angled top view of a portion of an extendable and a retractable vehicle step comprising an assembly using a rotatable sleeve.

Figure 10:
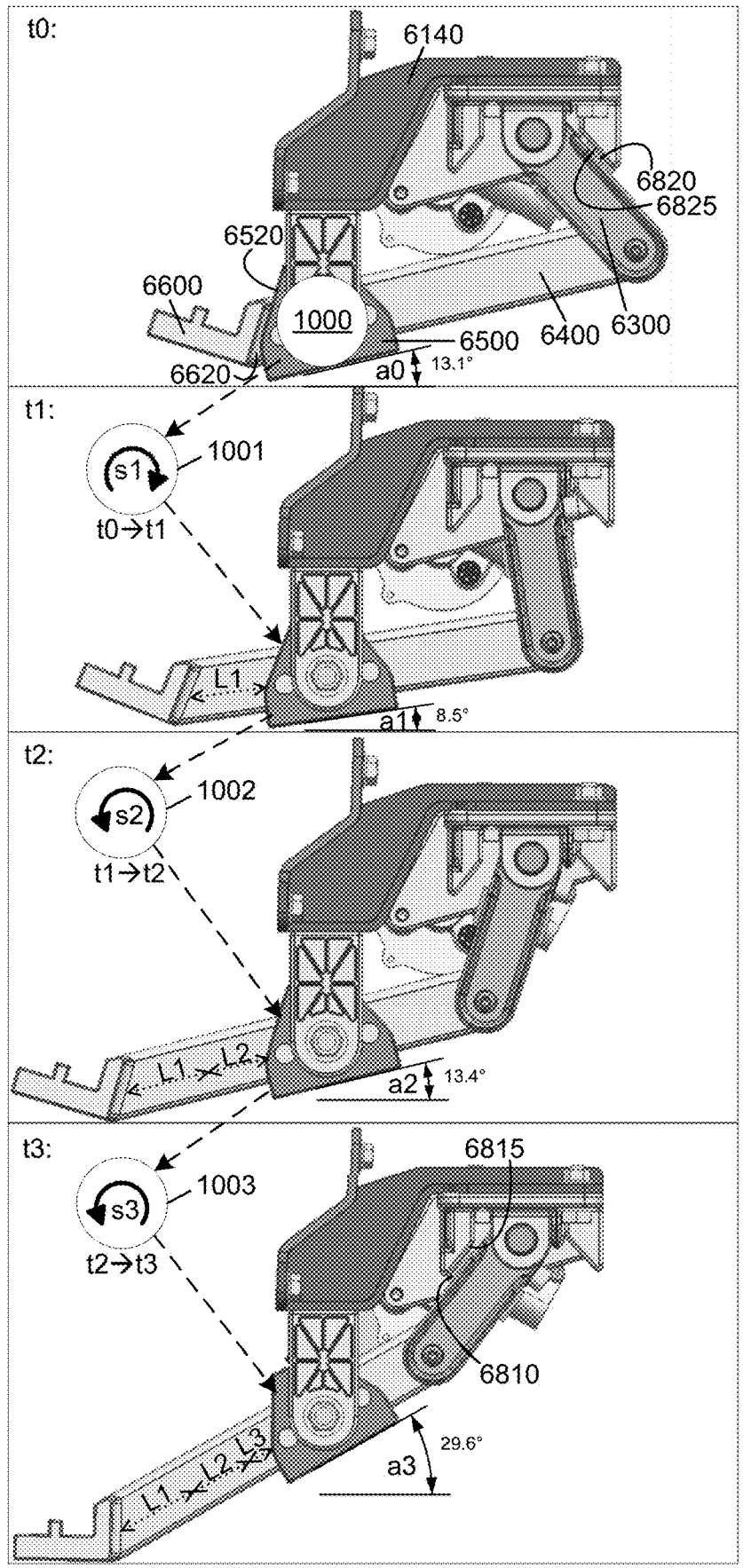

FIG. 10 shows an example of an extension of an assembly for an extendable and a retractable vehicle step.

Figure 11:
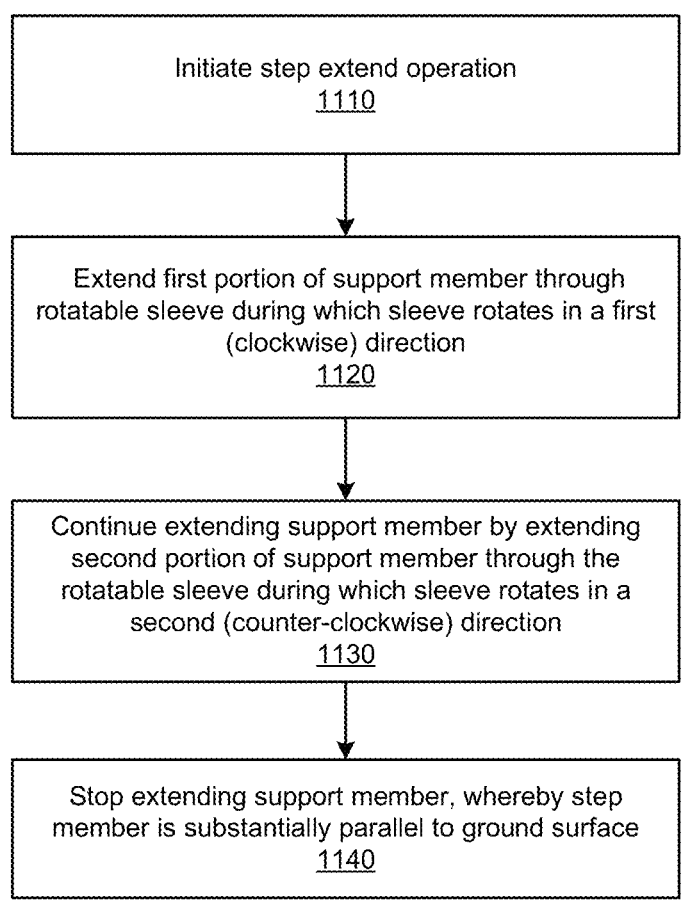

FIG. 11 shows an example method for extension of a vehicle step using an assembly comprising a rotatable sleeve.

Figure 12:
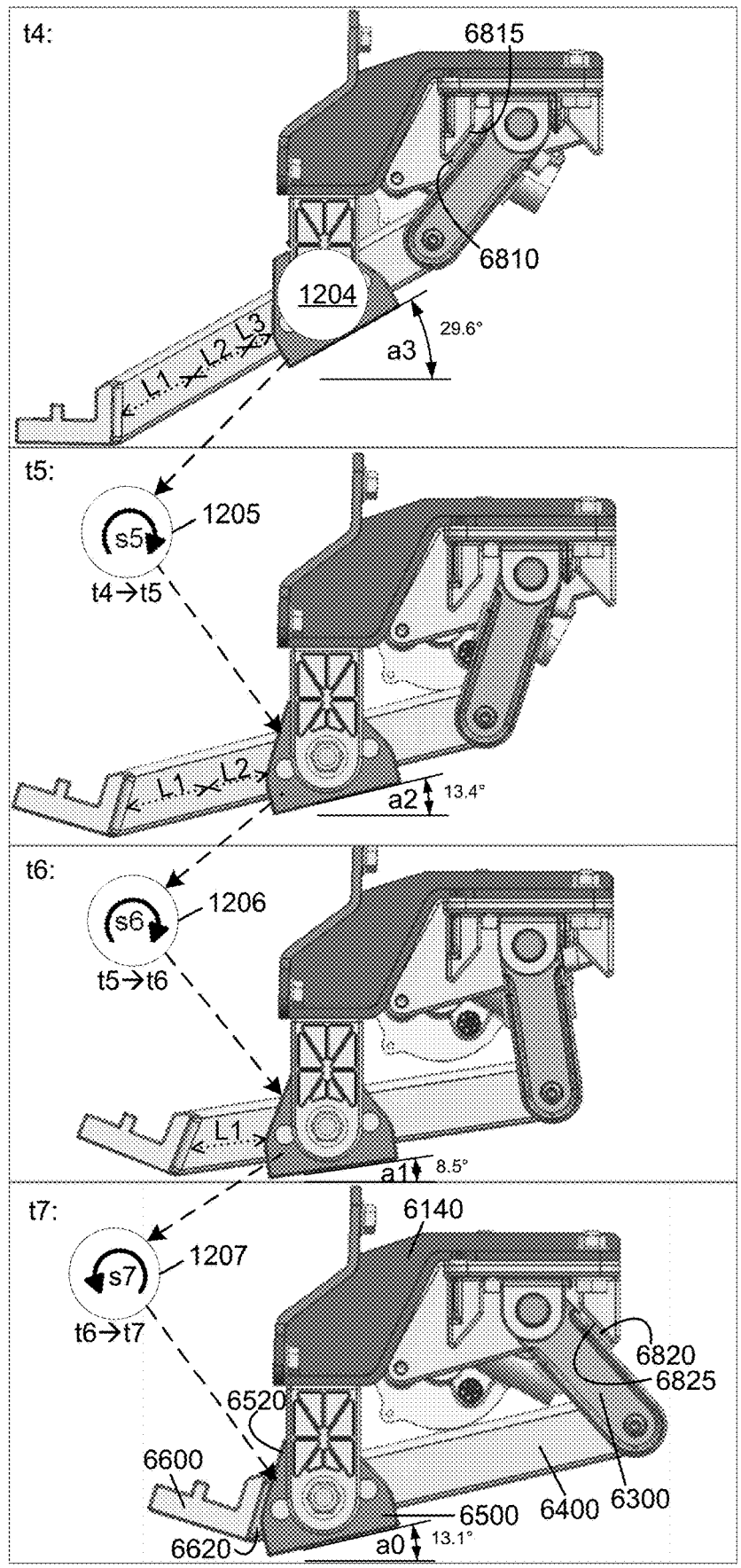

FIG. 12 shows an example of a retraction of an assembly for an extendable and a retractable vehicle step.

Figure 13:
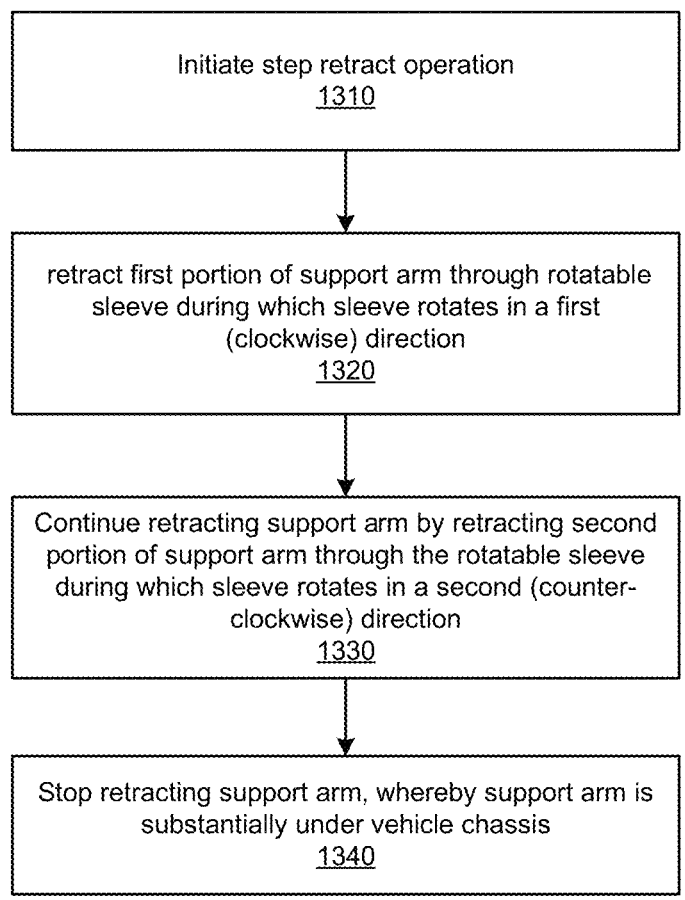

FIG. 13 shows an example method for retraction of a vehicle step using an assembly comprising a rotatable sleeve.

Figure 14:
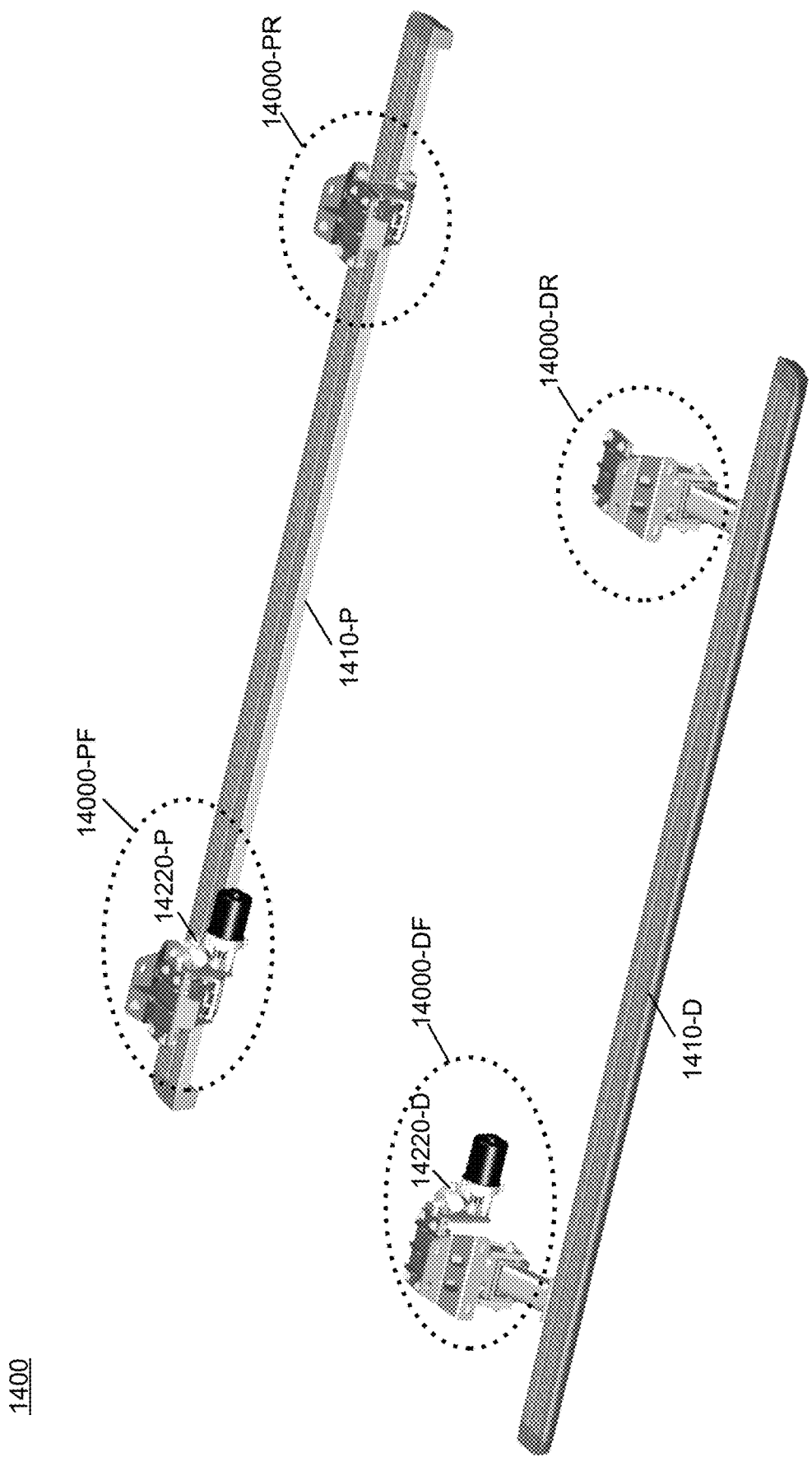

FIG. 14 shows a pair of extendable and retractable vehicle steps, each of which comprises a pair of assemblies for extending and retracting a vehicle step.

Figure 15:
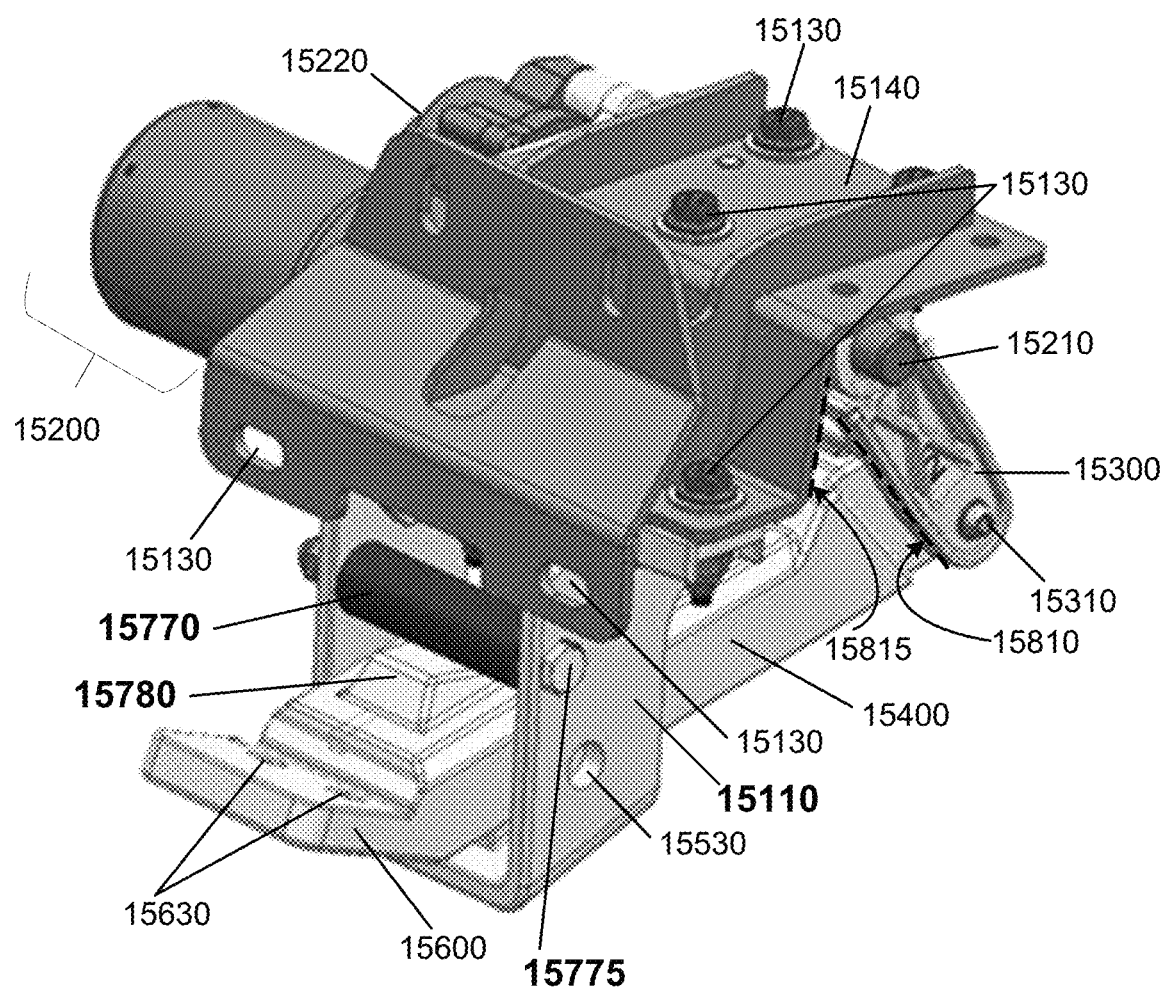

FIG. 15 shows an example of an angled top view of an assembly for an extendable and a retractable vehicle step, wherein the assembly comprises one or more rollers.

Figure 16:
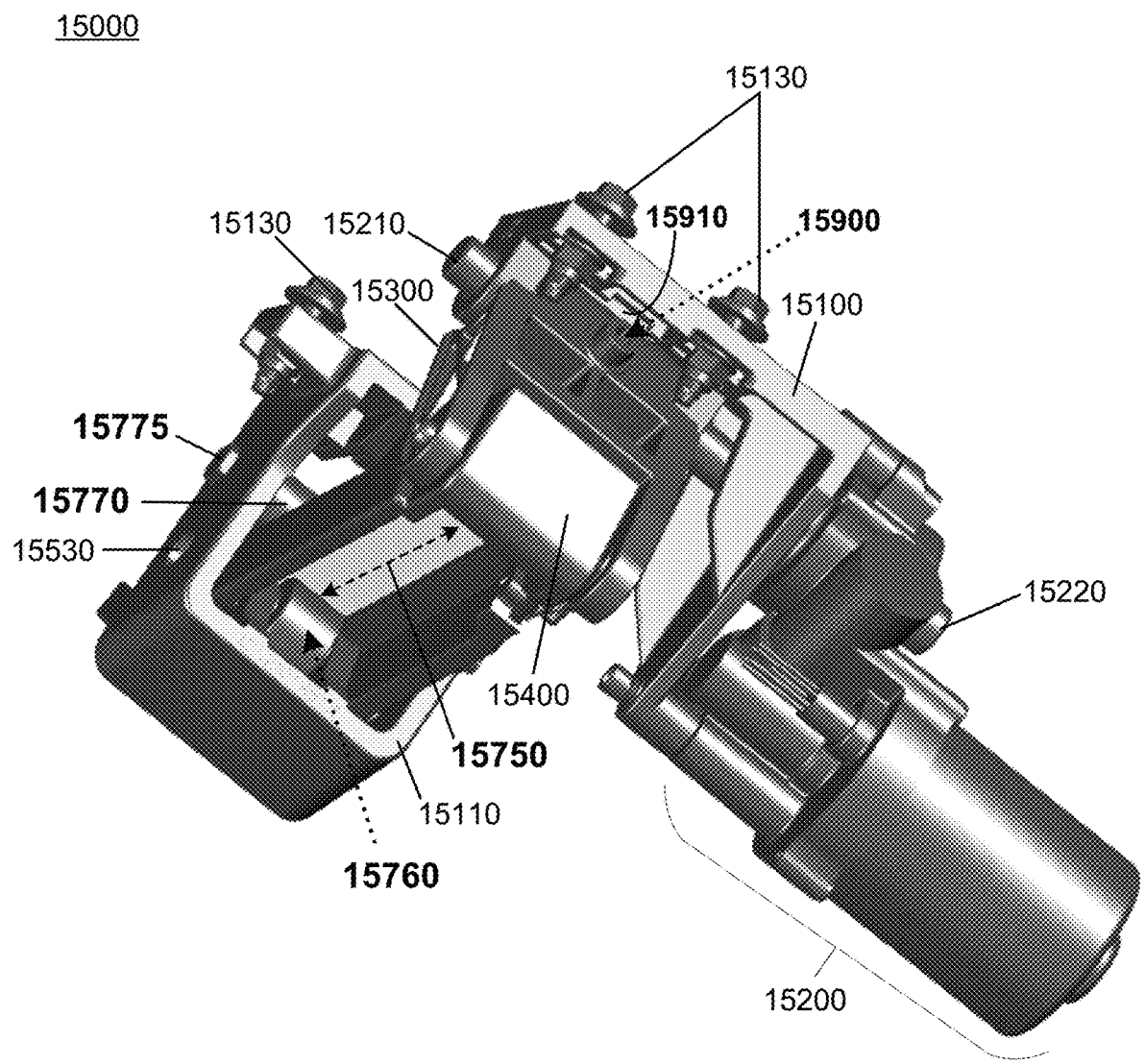

FIG. 16 shows an example of an angled bottom view of an assembly for an extendable and a retractable vehicle step, wherein the assembly comprises one or more rollers.

Figure 17A:
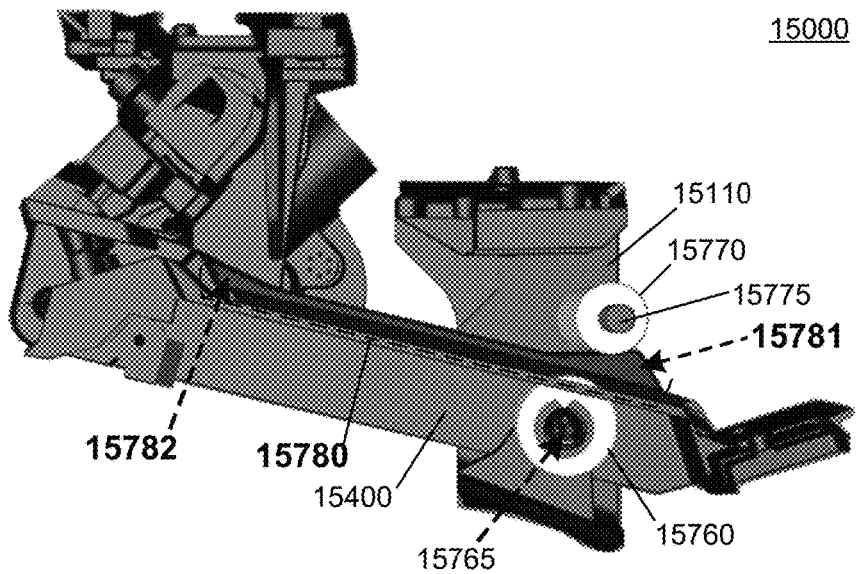

FIG. 17A shows an example side view of an assembly for an extendable and a retractable vehicle step, wherein the assembly comprises one or more rollers and is shown in a generally retracted position.

Figure 17B:
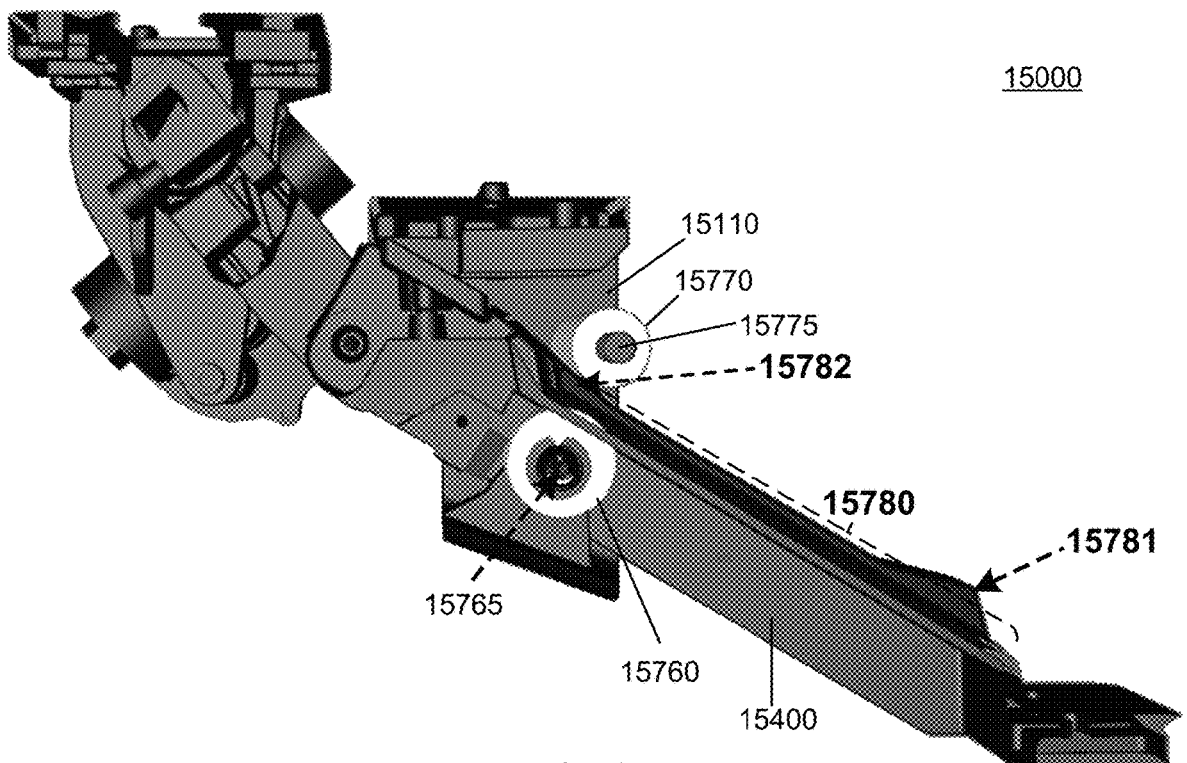

FIG. 17B shows an example side view of an assembly for an extendable and a retractable vehicle step, wherein the assembly comprises one or more rollers and is shown in a generally extended position.

Figure 18A:
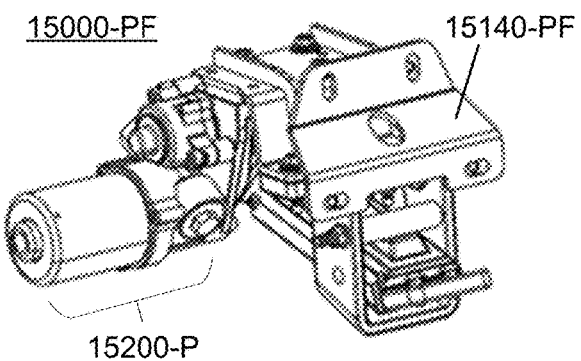

FIG. 18A shows an example of an assembly for an extendable and a retractable vehicle step, wherein the assembly comprises one or more rollers and may be configured for location generally near a passenger-side front door area of a vehicle.

Figure 18B:
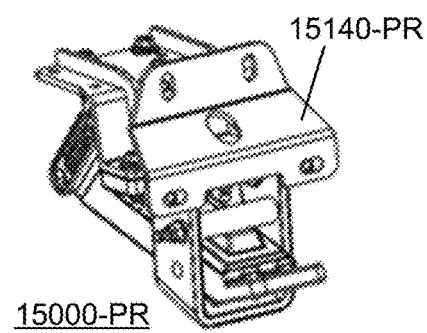

FIG. 18B shows an example of an assembly for an extendable and a retractable vehicle step, wherein the assembly comprises one or more rollers and may be configured for location generally near a passenger-side rear door area of a vehicle.

Figure 18C:
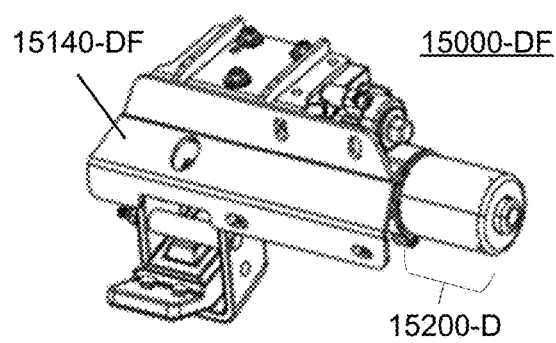

FIG. 18C shows an example of an assembly for an extendable and a retractable vehicle step, wherein the assembly comprises one or more rollers and may be configured for location generally near a driver-side front door area of a vehicle.

Figure 18D:
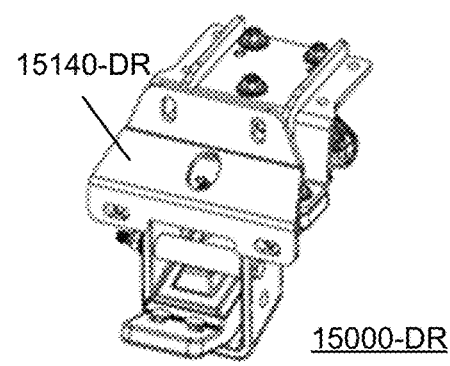

FIG. 18D shows an example of an assembly for an extendable and a retractable vehicle step, wherein the assembly comprises one or more rollers and may be configured for location generally near a driver-side rear door area of a vehicle.

Figure 19:
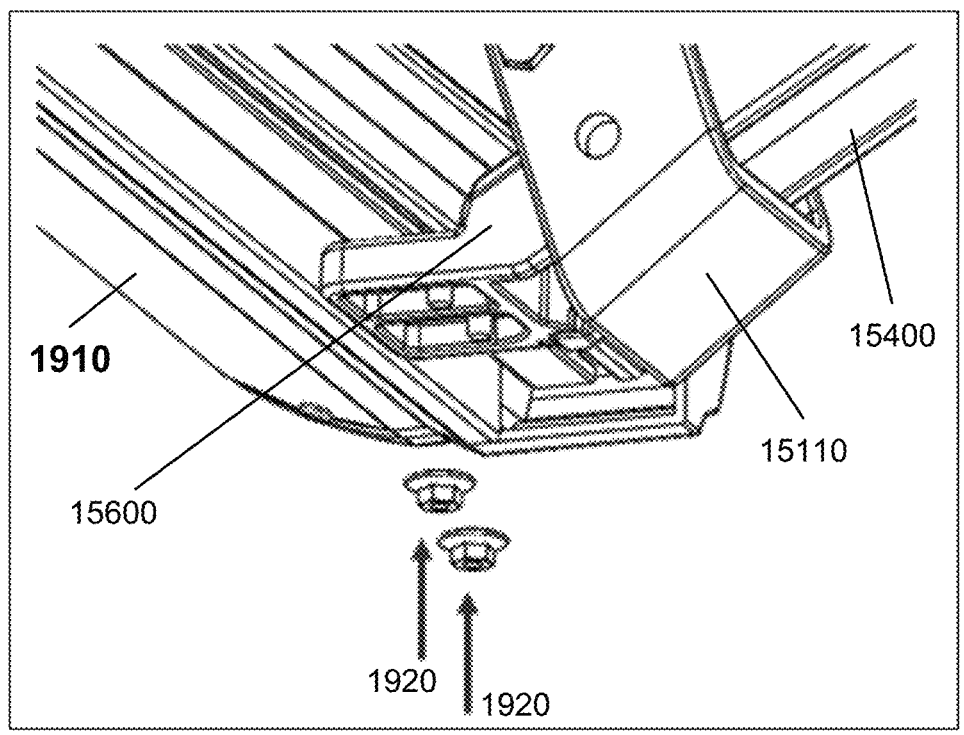

FIG. 19 shows an example of an assembly for an extendable and a retractable vehicle step being coupled to a footboard.

Figure 20:
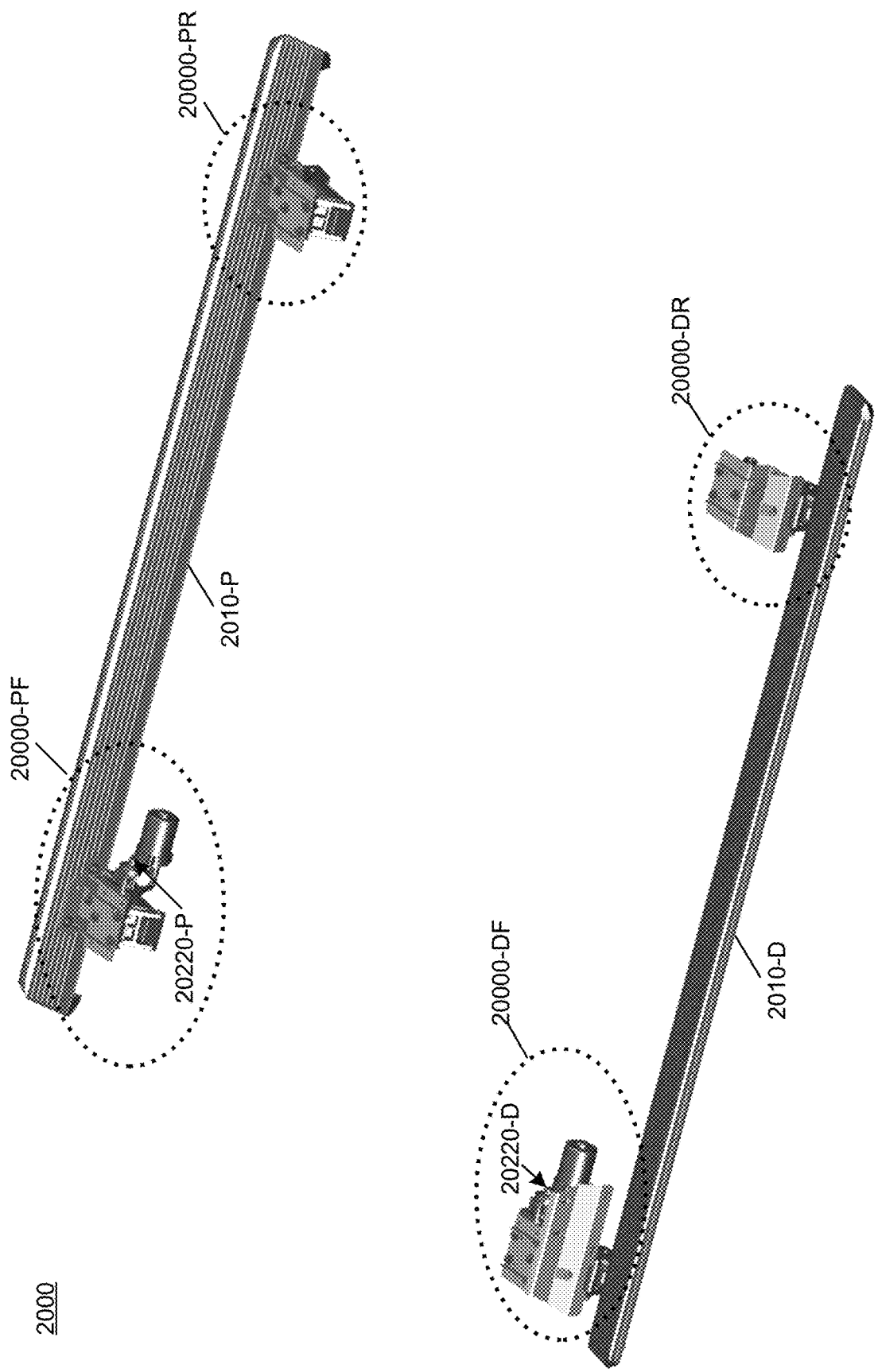

FIG. 20 shows a pair of extendable and retractable vehicle steps, each of which comprises a pair of assemblies for extending and retracting a vehicle step.

DETAILED DESCRIPTION

The embodiments of the present disclosure are described below in detail. Examples of the embodiments are shown in the drawings. The same or similar numerals represent the same or similar elements or elements having the same or similar functions throughout the specification. The embodiments described below with reference to the drawings are exemplary. They are only used to explain the present disclosure, and should not be construed as a limitation to the present disclosure. It is to be understood that other embodiments may be used, and structural and functional modifications may be made, without departing from the scope of the present disclosure.

In the description of the present disclosure, it should be understood that orientational or positional relationships indicated by terms such as "upper", "lower", "front", "rear", "left", "right", "top", "bottom", "inside" and "outside" are based on the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

In the description of the present disclosure, "several" means a number larger than one, while "a plurality of" means a number larger than two; "greater than", "less than", "over" and the like are construed as not including the number, and "above", "below", "within" and the like are construed as including the number. The "first" and "second" in the description are merely intended to distinguish technical features, and cannot be construed as indicating or implying relative importance or implicitly indicating a number of indicated technical features or implicitly indicating a sequence relationship of the indicated technical features.

In the description of the present disclosure, unless otherwise explicitly defined, the words such as "arrange", "install" and "connect" should be understood in a broad sense, and those skilled in the technical field can reasonably determine the specific meanings of the above words in the present disclosure in combination with specific contents of the technical solutions.

Figure 1:
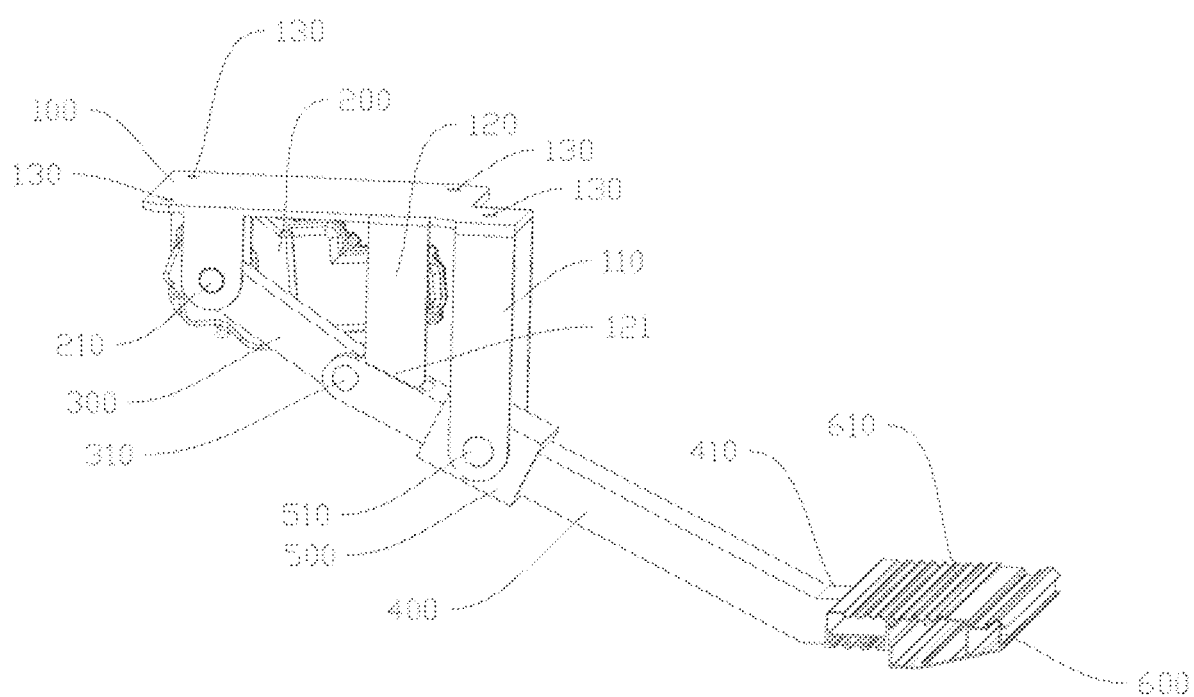
FIG. 1 is a schematic structural view of a rocker footboard device according to an embodiment in a first aspect of the present disclosure.
Figure 2:
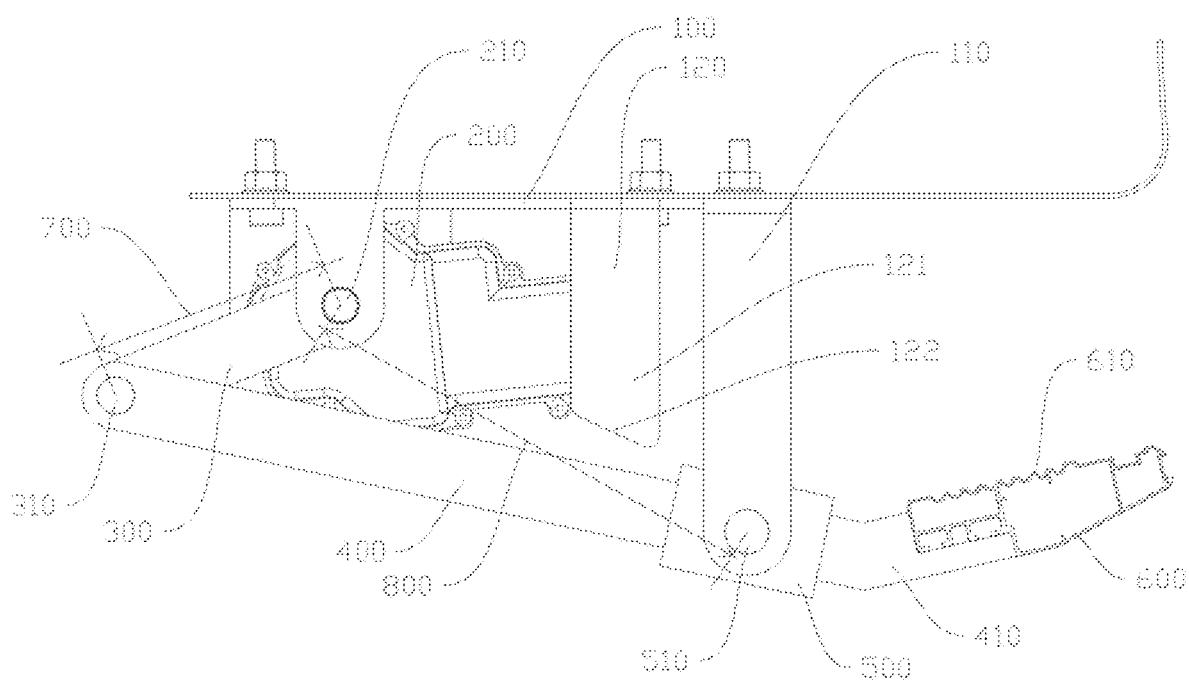
FIG. 2 is a schematic structural view of a second connecting rod in a retracted state according to an embodiment in the first aspect of the present disclosure.
Figure 3:
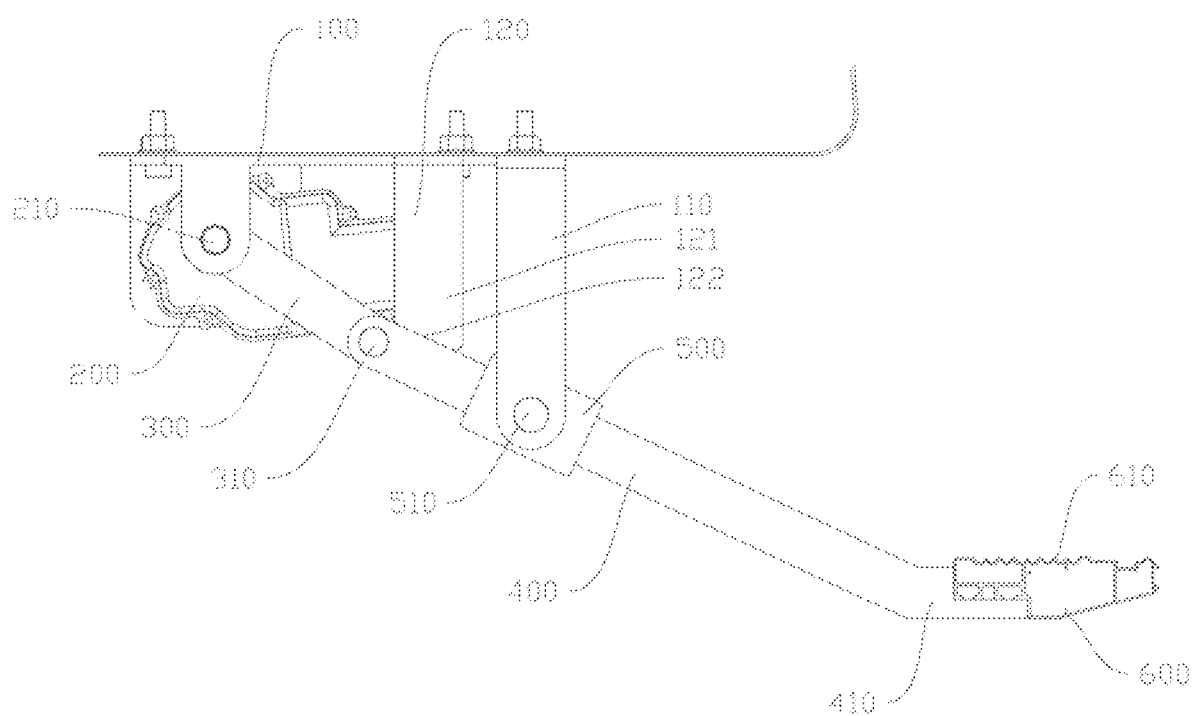
FIG. 3 is a schematic structural view of a second connecting rod in an extended state according to an embodiment in the first aspect of the present disclosure.

Referring to FIG. 1 to FIG. 3, descriptions are now made to a rocker footboard device provided by an embodiment of the present disclosure.

As shown in FIG. 1, the rocker footboard device in the embodiment of the present disclosure includes a mounting seat 100, a rotary driving device 200 arranged on the mounting seat 100, a first connecting rod 300, a second connecting rod 400, a sliding sleeve 500, and a footboard 600. The rotary driving device 200 is provided with a driving shaft 210. The first connecting rod 300 includes a first end fixedly connected with the driving shaft 210, and a second end pivotally connected with a first end of the second connecting rod 400 through a first pivot shaft 310. The footboard 600 is provided at a second end of the second connecting rod 400. The sliding sleeve 500 is pivotally connected with the mounting seat 100 through a second pivot shaft 510. A middle segment of the second connecting rod 400 is slidably provided on the sliding sleeve 500. An axis of the driving shaft 210, an axis of the first pivot shaft 310, and an axis of the second pivot shaft 510 are parallel to one another. A sliding channel is formed in the sliding sleeve 500, and the second connecting rod 400 is slidably provided in the sliding channel, such that the second connecting rod 400 can be slidably connected with the sliding sleeve 500.

The first connecting rod 300, the second connecting rod 400 and the sliding sleeve 500 are formed into a crank rocker mechanism. The rotary driving device 200 drives the first connecting rod 300 to rotate around the driving shaft 210, and the first connecting rod 300 drives the second connecting rod 400 to slide in the sliding channel of the sliding sleeve 500. As a result, the second connecting rod 400 can be extended and/or retracted relative to the sliding sleeve 500, thereby extending the footboard 600 when the footboard 600 is needed, or retracting the footboard 600 when the footboard 600 is not used. Referring to FIG. 3, when the first connecting rod 300 swings toward a direction close to the second pivot shaft 510, the first connecting rod 300 drives the second end of the second connecting rod 400 to extend toward a direction away from the second pivot shaft 510, thereby extending the footboard 600 at the second end of the second connecting rod 400 outward. Referring to FIG. 2, when the first connecting rod 300 swings toward the direction away from the second pivot shaft 510, the first connecting rod 300 drives the second end of the second connecting rod 400 to gradually get close to the second pivot shaft 510, thereby retracting the footboard 600. The crank rocker mechanism formed by the first connecting rod 300, the second connecting rod 400 and the sliding sleeve 500 can adjust the travel of the second connecting rod 400 through the length of the first connecting rod 300. The longer the first connecting rod 300, the larger the travel extended or retracted by the second connecting rod 400 under a same swing amplitude of the first connecting rod 300. Therefore, the travel extended or retracted by the second connecting rod 400 is adjusted conveniently.

Generally, a four-rod linkage mechanism is a parallelogram mechanism. To increase the travel, two swing rods need to be made longer, which greatly expands the traversing area of the swing rods. However, in the rocker footboard device described herein, a crank rocker mechanism formed by the first connecting rod 300, the second connecting rod 400 and the sliding sleeve 500 can adjust the travel of the second connecting rod 400 through the length of the first connecting rod 300, namely the travel can be increased by only adjusting the length of the first connecting rod 300. Compared with a four-rod linkage mechanism, in the rocker footboard device described herein the traversing area is reduced, and the crank rocker mechanism has a wider travel adjustment range.

According to the rocker footboard device in the embodiment, the rotary driving device 200 drives the first connecting rod 300 to rotate around the driving shaft 210, and the first connecting rod 300 drives the second connecting rod 400 to slide in the sliding sleeve 500. As a result, the second connecting rod 400 is extended and/or retracted, thereby extending the footboard 600 when the footboard 600 is needed, or retracting the footboard 600 when the footboard 600 is not used. Compared with a four-rod linkage mechanism, the rocker footboard device described herein has advantages such as a simpler structure, fewer parts, smaller size, lower manufacturing cost, and higher production efficiency. Moreover, under a same occupied space, the crank rocker mechanism described herein formed by the first connecting rod 300, the second connecting rod 400 and the sliding sleeve 500 has larger travel, allowing for greater convenience in adjusting the travel of the footboard 600, and a stronger universality.

It is to be noted that the rotary driving device 200 is a driving motor, and may also be a pneumatic motor or a hydraulic motor.

In a preferred embodiment of the present disclosure, referring to FIG. 2 and FIG. 3, a distance between the axis of the driving shaft 210 and the axis of the first pivot shaft 310 is a first distance 700, and a distance between the axis of the driving shaft 210 and the axis of the second pivot shaft 510 is a second distance 800. The first distance 700 is less than the second distance 800. That is, the rotational radius of the first connecting rod 300 is less than the second distance 800, which prevents the second end of the second connecting rod 400 from moving toward the rotary driving device 200, reduces the intervention, and makes the second connecting rod 400 extended or retracted more smoothly.

In a preferred embodiment of the present disclosure, referring to FIG. 1 and FIG. 2, the rotary driving device 200 is provided at an underside of the mounting seat 100, the underside of the mounting seat 100 is provided with a hinge seat 110, the second pivot shaft 510 is pivotally connected on the hinge seat 110, and the driving shaft 210 is higher than the second pivot shaft 510. That is, the driving shaft 210, the first pivot shaft 310 and the second pivot shaft 510 are located under the mounting seat 100, and the second pivot shaft 510 is located under the driving shaft 210, such that when the first connecting rod 300 rotates, the second connecting rod 400 is extended downward, the footboard 600 is extended downward obliquely, and thus the user gets on or off the vehicle conveniently.

In a preferred embodiment of the present disclosure, referring to FIG. 1 and FIG. 2, the rocker footboard device further includes: a stop block 120. The stop block 120 is located between the driving shaft 210 and the second pivot shaft 510. An upper end of the stop block 120 is connected with the mounting seat 100, and a lower side of the stop block 120 is provided with an abutting portion 121 abutting against the second connecting rod 400. As shown in FIG. 3, when the second connecting rod 400 is extended under the driving of the first connecting rod 300, the stop block 120 abuts against the second connecting rod 400. In this case, the stop block 120 is configured to prevent the second connecting rod 400 from moving upward continuously and the first connecting rod 300 from rotating offside, and the stop block 120 applies a downward force to the second connecting rod 400. When getting on the vehicle, the user needs to step on the footboard 600, with a downward force applied to the second end of the second connecting rod 400. In this case, the stop block 120 supports the first end of the second connecting rod 400, which prevents the second connecting rod 400 from swinging around the second pivot shaft 510, fixes the footboard 600, and prevents the footboard 600 from moving when the user gets on or off the vehicle.

In a preferred embodiment of the present disclosure, referring to FIG. 1 and FIG. 2, the abutting portion 121 is provided with an abutting surface 122 abutting against the second connecting rod 400. The abutting surface 122 is matched with an outer side of the second connecting rod 400 in shape. Since the abutting surface 122 is matched with the outer side of the second connecting rod 400 in shape, the abutting surface 122 abuts against the outer side of the second connecting rod 400 better, the abutting area is increased, the pressure is reduced, and the second connecting rod 400 is not broken. For example, when the second connecting rod 400 is a round rod, the abutting surface 122 is a cylindrical surface. When the second connecting rod 400 is a square rod, the abutting surface 122 is a plane with the matched shape, such that the abutting surface 122 is better attached to the second connecting rod 400.

In a preferred embodiment of the present disclosure, referring to FIG. 2 and FIG. 3, when the second connecting rod 400 abuts against the abutting surface 122, the second end of the second connecting rod 400 is extended, and an upper side of the footboard 600 keeps horizontal. That is, when the second connecting rod 400 is extended under the driving of the first connecting rod 300 and abuts against the abutting surface 122, the upper side of the footboard 600 keeps horizontal. With the horizontal upper side of the footboard 600, the user can step on the footboard more stably, and get on or off the vehicle conveniently.

In a preferred embodiment of the present disclosure, referring to FIG. 1, the mounting seat 100 is provided with a plurality of mounting holes 130. The mounting seat 100 can be mounted on the vehicle body via bolts passing through the mounting holes 130. Therefore, the mounting seat 100 is mounted conveniently, the rocker footboard device is provided on the vehicle body conveniently, and the mounting efficiency is improved.

In a preferred embodiment of the present disclosure, referring to FIG. 1 and FIG. 2, the second end of the second connecting rod 400 is provided with a bending portion 410 which bends upward, and the footboard 600 is provided on the bending portion 410. With the bending portion 410, the angle of the footboard 600 can be adjusted, and the upper side of the extended footboard 600 can keep horizontal for ease of use.

In a preferred embodiment of the present disclosure, referring to FIG. 1 and FIG. 2, a friction texture 610 is provided at the upper side of the footboard 600. With the friction texture 610, the frictional force at the upper side of the footboard 600 can be increased, and the user does not slip and fall when getting on or off the vehicle.

Figure 4:
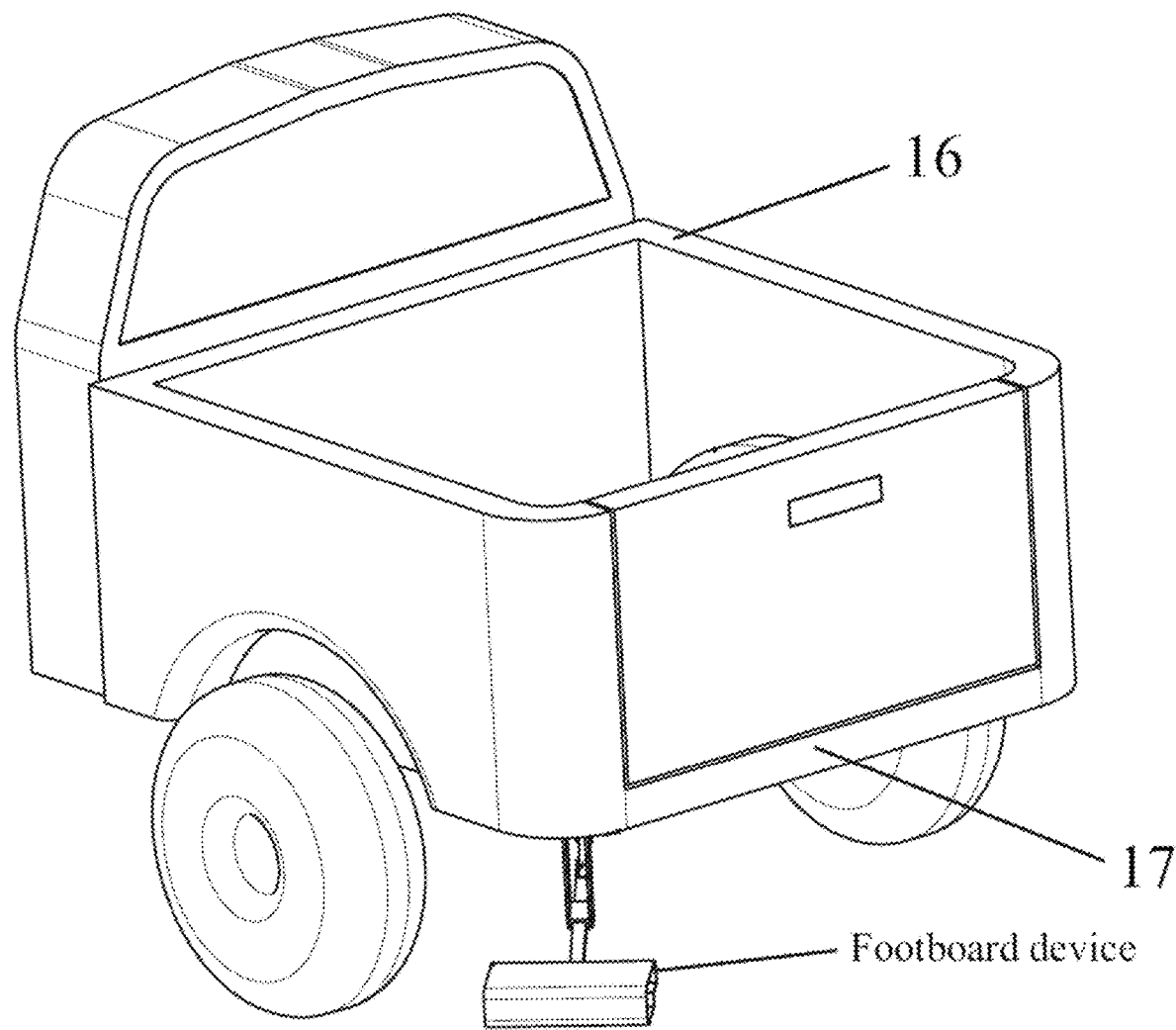
FIG. 4 is a schematic structural view of an installation structure of a vehicle and a rocker footboard device in an embodiment of the present invention.

Referring to FIG. 4, an embodiment of the present disclosure further provides a vehicle, including a vehicle body 16, and the above rocker footboard device. The vehicle body 16 is provided with a chassis 17. The mounting seat 100 is provided at a bottom of the chassis 17. The rotary driving device 200, the first connecting rod 300, and the second connecting rod 400 are located under the chassis 17. The rocker footboard device is provided on the chassis 17 of the vehicle body 16, located under a vehicle door, and configured for a user to get on or off the vehicle conveniently. The rocker footboard device does not have to be located on a specific position of the vehicle body 16, but can be any position where the rocker footboard device is required. The rotary driving device 200 of the rocker footboard device drives the first connecting rod 300 to rotate around the driving shaft 210, and the first connecting rod 300 drives the second connecting rod 400 to slide in the sliding sleeve 500. As a result, the second connecting rod 400 is extended or retracted, thereby extending the footboard 600 when the footboard 600 is needed, or retracting the footboard 600 when the footboard 600 is not used. Compared with a four-rod linkage mechanism, the rocker footboard device described herein has advantages such as a simpler structure, fewer parts, smaller size, lower manufacturing cost, and higher production efficiency. Moreover, under a same occupied space, the crank rocker mechanism described herein formed by the first connecting rod 300, the second connecting rod 400 and the sliding sleeve 500 has larger travel, allowing for greater convenience in adjusting the travel of the footboard 600, and a stronger universality.

While "rocker footboard device" is used herein, such as with respect to FIGS. 1-4 and their corresponding descriptions, one of ordinary skill in the art readily understands that any extendable and retractable "vehicle step," such as described herein, may comprise one or more such "rocker footboard devices." For example, two (or more) rocker footboard devices, each as a respective "assembly," may be coupled to an elongated footboard to provide an extendable and a retractable vehicle step. Accordingly, an extendable and a retractable vehicle step may comprise two or more of the rocker footboard devices described herein, such as for use alongside one or more doors of a vehicle.

FIG. 5 shows an example of a pair of rocker footboard devices coupled to a footboard and mounted to a vehicle. The configuration shown in FIG. 5 may provide an extendable and a retractable vehicle step. Assembly 5000-DF may comprise a driver-side front rocker footboard device, such as described with respect to FIGS. 1-4. Assembly 5000-DF may comprise a motor (not shown) for controlling an extension of the vehicle step 5010 from a position substantially underneath a vehicle 16 to or near a ground surface, and for controlling a retraction of the vehicle step 5010 from or near a ground surface to a position substantially underneath the vehicle 16. The assembly 5000-DF may be mounted to a chassis 17 of the vehicle 16 (e.g., near a driver-side front door). Assembly 5000-DR may comprise a drive-side rear rocker footboard device that may be mounted to the chassis 17 of the vehicle 16 (e.g., near a driver-side rear door). The assembly 5000-DR may comprise the rear rocker footboard device described with respect to FIGS. 1-4 or a variation thereof. For example, the assembly 5000-DR may (optionally) lack the rotary driving device 200 of the rocker footboard device described with respect to FIGS. 1-4. Rather, the assembly 5000-DR may be coupled to a first end of a driving shaft (not shown), such as the driving shaft 210 described herein. A second end of the driving shaft may be controlled by a motor, such as the rotary driving device 200 described with respect to FIGS. 1-4. That is, the pair of assemblies 5000-DF and 5000-DR may be controlled by a single motor, such as the rotary driving device 200 of the rocker footboard device described with respect to FIGS. 1-4, coupled to both assemblies 5000-DF and 5000-DR via opposite sides of a driving shaft, such as the driving shaft 210 of the rocker footboard device described with respect to FIGS. 1-4. While not shown in FIG. 5, a pair of rocker footboard devices may additionally or alternatively be coupled to a vehicle step and mounted to the vehicle on the passenger side in a manner similar to that described above.

FIG. 6 shows an example of a side view of an assembly 6000 for an extendable and a retractable vehicle step, wherein the assembly comprises a rotatable sleeve. The assembly 6000 may comprise a first support arm 6300 and a second support arm 6400. The first support arm 6300 and the second support arm 6400 may operate in a manner similar to the first connecting rod 300 and the second connecting rod 400, respectively, described with respect to FIGS. 1-4. The first support arm 6300 may be pivotably coupled to the second support arm 6400 by a joint 6310. The first support arm 6300 may be shorter than the second support arm 6400. For example, the first support arm may have a length that may be approximately half of a length of the second support arm 6400. Based on a configuration of the second support arm 6400 being (substantially) longer than the first support arm 6300, a greater range of extension may be achieved while using a relatively small area of operation (e.g., under a chassis of a vehicle), such as when the first support arm 6400 rotates from a retracted position to an extended position, or vice versa. The joint 6310 may comprise a pin or any other mechanism allowing rotation of each of the first support arm 6300 and the second support arm 6400 about the other. The second support arm 6400 may have a footboard mount 6600 (or footboard) at an end opposite from the joint 6310. The footboard mount may comprise one or more holes 6630 (such as shown in FIG. 8) for mounting a footboard on its surface. The footboard mount 6600 (or footboard) may be angled relative to a linear direction of the second support member 6400. For example, a surface of the footboard mount 6600 (or footboard) for accommodating a person's foot when in use may be approximately 25 degrees to 60 degrees to the parallel of an elongated length of the second support member 6400. Any other angle of the footboard mount 6600 (or footboard) relative to the elongated length of the second support member 6400 may be implemented (e.g., 15 degrees, 20 degrees, . . . 30 degrees, . . . 45 degrees, etc.). The angle of the footboard mount 6600 (or footboard) relative to the elongated length of the second support member 6400 may be based on the relative proportions of the length of the first support arm 6300 and the second support arm 6400, and/or the overall lengths of the first support arm 6300 and/or the second support arm 6400.

The assembly 6000 may comprise a mounting body 6100 and a support bracket 6110. The mounting body 6100 and the support bracket 6110 may operate in a manner similar to the mounting seat 100 and the hinge seat 110, respectively, described with respect to FIGS. 1-4. The assembly 6000 may (optionally) comprise a frame 6140. The frame 6140 may be coupled to the mounting body 6100 and/or the support bracket 6110, such as by one or more hardware assemblies 6130. A hardware assembly 6130 may comprise one or more of a bolt, washer(s), and/or a nut. Additionally or alternatively, the frame 6140 may be coupled to the mounting body 6100 and/or the support bracket 6140 by welding and/or any other attachment mechanism. While the assembly 6000 is shown with a particular frame 6140, any other shape, size, or configuration of a frame (or none at all) may be used, for example, depending upon a vehicle manufacturer, vehicle model, mounting surface, and/or mounting area for attachment of the mounting body 6100 and/or the support bracket 6110 to a vehicle (e.g., to a chassis of a vehicle, such as the chassis 17 of the vehicle 16 shown in FIG. 5). The assembly 6000 may (optionally) comprise a motor 6200. The motor 6200 may comprise any driving mechanism used for rotating a rod 6210 (shown in-part). The rod 6210 may be coupled to the first support arm 6300, such as via a bracket of the mounting body 6100, to control rotational movement of the first support arm 6300. While not shown in FIG. 6 at such a length, the rod 6210 may extend to approximately a length of a footboard, along a side of a vehicle, to couple two (or more) assemblies of an extendable and a retractable vehicle step. The assembly 6000 may (optionally) not comprise the motor 6200. For example, a pair of assemblies 6000 may be coupled to a footboard to provide an extendable and retractable vehicle step that may be controlled by a single motor (e.g., motor 6200 coupled to one of the two assemblies 6000), whereby a first assembly 6000 that may lack a motor may be coupled to an opposite end of the rod 6210 (e.g., such as at point 6220 shown in FIG. 7) that may be powered by the motor 6200 of a second assembly 6000.

The assembly 6000 may comprise a rotatable sleeve 6500. The rotatable sleeve 6500 may be rotatable about a joint 6510 that may couple the rotatable sleeve 6500 to the support bracket 6110. The joint 6510 may comprise one or more pins, bolts, rollers, or any other mechanism allowing rotation of the rotatable sleeve 6500 relative to the support bracket 6110. As shown in FIG. 6, the joint 6510 may comprise a nut, which may be coupled to a threaded end of a bolt on one or two sides of the rotatable sleeve 6500. Alternatively, the joint 6510 may comprise a bolt passing through the second support arm 6400. Additionally or alternatively, as shown in more detail in FIG. 7, the joint 6510 may comprise one or more bolts (e.g., two bolts), whereby a joint comprising a portion of a threaded bolt, a nut, and/or a washer, may be provided on both sides of the support bracket 6110 (e.g., such that neither bolt passes through the second support arm 6400). As shown in FIG. 6, the support bracket 6110 may be configured in a fixed manner so as not to rotate. Alternatively, the support bracket 6110 may be configured to be rotatable (e.g., at a joint (not shown) to the frame 6140) such that both the rotatable sleeve 6500 and the support bracket 6110 may rotate about the other. The rotatable sleeve 6500 may comprise one or more holes 6530. Holes 6530 may generally be non-functional, such as being a result from machining holes for configuring rollers (not shown) that may be coupled to the rotatable sleeve 6500 to facilitate movement of the second support arm 6400 through the rotatable sleeve 6500.

The mounting body 6100 may comprise stopper 6815 and/or stopper 6825. Stopper 6815 and/or stopper 6825 may comprise the same material as the mounting body 6100 or may comprise some other material such as rubber, foam, and/or any other material suitable for facilitating smooth, quiet, and/or reliable stopping of movement of the first support arm 6300. The first support arm may comprise stopper 6810 and/or stopper 6820. Stopper 6810 of the first support arm 6300 may touch stopper 6815 of the mounting body 6100, for example, if the assembly 6000 operates to fully extend a vehicle step. Stopper 6820 of the first support arm 6300 may touch stopper 6825 of the mounting body 6100, for example, if the assembly 6000 operates to fully retract a vehicle step. The first support arm 6300 may comprise a back stopper 6900, for example, in addition or in the alternative to stopper 6810 and/or stopper 6820. Back stopper 6900 may touch a surface of a cavity 6910 (shown in FIG. 8), for example, if the assembly 6000 operates to fully retract a vehicle step. One or more of back stopper 6900 and/or stopper 6820 may be adjusted and/or varied in thickness, for example, to accommodate different mounting areas for the assembly 6000 so as to achieve a desired retracted position of the assembly 6000 (e.g., substantially under a vehicle and/or to avoid undesired touching of other vehicle components, such as wiring, cables, hardware, mechanical parts, etc.).

The rotatable sleeve 6500 may comprise a stopping surface 6520. Additionally or alternatively, the second support arm 6400 may comprise a stopping surface 6620. The stopping surface 6520 of the rotatable sleeve may touch a stopping surface 6620 of the second support arm 6400, for example, as an additional stopping mechanism (e.g., a backup mechanism) and/or as an alternative stopping mechanism to the stopper 6820, stopper 6825, and/or back stopper 6900, if the assembly 6000 operates to fully retract a vehicle step.

FIG. 7 shows an example of an angled top view of an assembly for an extendable and a retractable vehicle step, wherein the assembly comprises a rotatable sleeve. The assembly of FIG. 7 may comprise the assembly 6000 described with respect to FIG. 6. As shown in FIG. 7, the assembly 6000 may (optionally) comprise a top channel 6700 in the second support arm 6400. The top channel 6700 may comprise an indentation and/or a cutout on a top surface of the second support arm 6400. Additionally or alternatively, the top channel 6700 may comprise a flat surface of the second support arm 6400, whereby the top channel 6700 may be formed by two linear protrusions on either side of the top channel 6700. The rotatable sleeve 6500 may comprise a guide pin 6710. The guide pin 6710 may comprise any material. The guide pin 6710 may be adjustable, such as a screw inserted into a threaded hole of the rotatable sleeve 6500. The guide pin 6710 may comprise a diameter that may be equal to or less than a width of the top channel 6700. The guide pin 6710 and/or top channel 6700 may operate to maintain alignment (e.g., prevent/reduce sideways movement) of the second support arm 6400, for example, as the second support arm 6400 passes through the rotatable sleeve 6500. The guide pin 6710 and/or top channel 6700 may provide for extension and/or retraction of a vehicle step in a smooth and/or steady manner, that may improve overall performance of an extendable and a retractable vehicle step.

FIG. 8 shows an example of an angled bottom view of an assembly for an extendable and a retractable vehicle step, wherein the assembly comprises a rotatable sleeve. The assembly of FIG. 8 may comprise the assembly 6000 described with respect to FIG. 6 and/or FIG. 7. As shown in FIG. 8, the assembly 6000 may (optionally) comprise a bottom channel 6750 in the second support arm 6400. The bottom channel 6750 may comprise an indentation and/or a cutout on a bottom surface of the second support arm 6400. The bottom channel 6750 may comprise a substantially hollow portion and/or cavity of the second support arm 6400. A substantially hollow configuration and/or cavity of the second support arm 6400 such as described herein may provide advantages such as reduced cost, reduced material, lighter weight, and/or smoother and/or more stable operation for extension and/or retraction of a vehicle step. The rotatable sleeve 6500 may comprise one or more rollers, such as a first roller 6760 and/or a second roller 6765. Any quantity of rollers may be used (e.g., one roller, two rollers, three rollers, a row of rollers, and/or multiple rolls of rollers of any quantity). Any type of rotatable object may be used in place of rollers, such as ball bearings, and/or any other object(s) and/or material may be used, for example, to reduce friction between the rotatable sleeve 6500 and the second support arm 6400. The first roller 6760 and/or the second roller 6765 may be used to support the second support arm 6400. The first roller 6760 and/or the second roller 6765 may be modified to fit a bottom channel 6750 of any dimension (e.g., width and/or depth). The first roller 6760 and/or the second roller 6765 may comprise a diameter that may be equal to or less than a width of the bottom channel 6700. The first roller 6760, the second roller 6765, and/or the bottom channel 6750 may operate to maintain alignment (e.g., prevent/reduce sideways movement) of the second support arm 6400, for example, as the second support arm 6400 passes through the rotatable sleeve 6500. The first roller 6760, the second roller 6765, and/or the bottom channel 6750 may provide for extension and/or retraction of a vehicle step in a smooth and/or steady manner, that may improve overall performance of an extendable and a retractable vehicle step.

FIG. 9 shows an example of an angled top view of a portion of an extendable and a retractable vehicle step comprising an assembly using a rotatable sleeve. An extendable and a retractable vehicle step vehicle step may be shown in-part as portion 9001 that may comprise an assembly 9000 and a footboard 910. The assembly 9000 may comprise an assembly similar to the assembly 6000 described with respect to FIG. 6, FIG. 7, and/or FIG. 8. The vehicle step may comprise the portion 9001 shown in FIG. 9, as well as an additional assembly (not shown) corresponding to the assembly 9000 but with an addition of a motor (such as motor 6200 described with respect to FIG. 6). The vehicle step may comprise a rod (such as rod 6210 described with respect to FIG. 6) for coupling the assembly 9000 to the motor of the additional assembly of the vehicle step.

The assembly 9000 may operate in a similar manner as described with respect to the assembly 6000, with one or more differences such as described herein. The assembly 9000 may comprise a second support arm 9400 that may be similar to the second support arm 6400 of the assembly 6000. Unlike as shown with respect to the second support arm 6400 of the assembly 6000, the second support arm 9400 of the assembly 9000 is shown comprising a channel guide 9710 at an end of the second support arm 9400 closest to the footboard 910. The assembly 9000 may comprise a rotatable sleeve 9500 that may be similar to the rotatable sleeve 6500 of the assembly 6000. Unlike as shown with respect to the rotatable sleeve 6500 of the assembly 6000, the rotatable sleeve 9500 of the assembly 9000 may comprise a channel 9700 on an inner top surface of the rotatable sleeve 9500. The channel guide 9710 and the channel 9700 of the assembly 9000 may operate together in a similar manner as the channel 6700 and the guide pin 6710 of the assembly 6000 as described with respect to FIG. 7. For example, the channel guide 9710 and the channel 9700 may operate to maintain alignment (e.g., prevent/reduce sideways movement) of the second support arm 9400 as the second support arm 9400 passes through the rotatable sleeve 9500. The channel guide 9710 and the channel 9700 may provide for extension and/or retraction of a vehicle step in a smooth and/or steady manner, that may improve overall performance of an extendable and a retractable vehicle step. Any assembly described herein may comprise one or more of a channel 6700 (e.g., in/on a second support arm), guide pin 6710 (e.g., in/on a rotatable sleeve), channel guide 9710 (e.g., in/on a second support arm), and/or channel 9700 (e.g., in/on a rotatable sleeve).

The assembly 9000 may comprise a first support arm 9300 that may be similar to the first support arm 6300 of the assembly 6000. The second support arm 9300 of the assembly 9000 may comprise a stopper (not shown) and/or a back stopper (not shown) on a first side, such as the stopper 6820 and/or the back stopper 6900 shown and described with respect to FIG. 8. Unlike as shown with respect to the first support arm 6300 of the assembly 6000, the second support arm 9300 of the assembly 9000 may not comprise a stopper on a second side (such as the stopper 6810 of the assembly 6000), for example, if the second support arm 9300 is configured not to touch a mounting body 9100 and/or a frame 9140 when a vehicle step that comprises the assembly 9000 is in a fully extended position. Similarly, the mounting body 9100 may comprise a stopper 9825 on a first side (such as the stopper 6825 of the assembly 6000) and may (optionally) not comprise a stopper on a second side (such as the stopper 6815 of the assembly 6000), for example, if the second support arm 9300 is configured not to touch the mounting body 9100 and/or the frame 9140 when a vehicle step that comprises the assembly 9000 is in a fully extended position.

The assembly 9000 may comprise a support bracket 9110 that may be similar to the support bracket 6110 of the assembly 6000. The support bracket 9110 may comprise a trapezoidal shape as shown in FIG. 9, or any other shape (such as a rectangle with half-circle bottom as shown in FIGS. 6-8 with respect to the support bracket 6110, a triangular, a square, a rectangular, a circle, an oval-shape, etc.). Any assembly described herein may comprise a support bracket having any shape. The support bracket 9110 may be configured to comprise a stopping surface 9810 on an upper portion of the support bracket 9110. The stopping surface 9810 may be configured to touch the frame 9140 at a stopping surface 9815 of the frame 9140, for example, at a fully extended position of a vehicle step comprising the assembly 9000. The stopping surface 9810 and/or the stopping surface 9815 of the assembly 9000 may be configured to operate together in a similar manner as the stopper 6810 and/or the stopper 6815 of the assembly 6000. For example, the stopping surface 9810 of the support bracket 9110 may touch the stopping surface 9815 of the frame 9140, for example, if the assembly 9000 operates to fully extend a vehicle step. The stopping surface 9810 may touch the stopping surface 9815 such that further extension of a vehicle step is prevented. Additionally or alternatively, the mounting body 9110 may be configured to comprise the stopping surface 9815 (e.g., if the frame 9140 does not comprise a stopping surface) and/or a different/additional stopping surface, which may prevent (and/or which may help to prevent) further extension of a vehicle step.

The assembly 9000 may comprise a motor, such as motor 6200 described with respect to FIG. 6. Any assembly described herein may (or may not) comprise a motor. For example, a vehicle step may comprise two (or more) of any assembly described herein, wherein at least one of the assemblies may comprise a motor for controlling extension and/or retraction of a vehicle step. Each assembly of the vehicle step may be coupled via a rod (such as rod 6210) to be controlled (e.g., rotated clockwise and/or rotated counterclockwise) by a motor of at least one of the assemblies. Rotation of the rod in a clockwise direction may cause the vehicle step to extend. Rotation of the rod in a counterclockwise direction may cause the vehicle step to retract. Alternatively, the vehicle step may be configured to operate in an opposite direction of rotation such that rotation of the rod in a counterclockwise direction may cause the vehicle step to extend, and rotation of the rod in a clockwise direction may cause the vehicle step to retract.

While not shown in FIG. 9, the assembly 9000 may comprise any feature described herein with respect to the assembly 6000 and/or any other assembly described herein. For example, the assembly 9000 may comprise one or more rollers such as roller 6760 and/or roller 6765, a bottom channel such as bottom channel 6750, and/or any other feature described herein.

FIG. 10 shows an example of an extension of an assembly, such as the assembly 6000 shown in FIG. 6. While assembly 6000 is shown as an example, the operations with respect to FIG. 10 may apply to any assembly described herein. FIG. 10 shows four moments in time (t0, t1, t2, and t3) during a process of extending an extendable and a retractable vehicle step comprising one or more assemblies (e.g., assembly 6000). At time t0, the assembly 6000 is fully retracted. For example, the stopper 6825 of the mounting body 6100 is shown touching (or almost touching) the stopper 6820 of the first support arm 6300, and the stopping surface 6520 of the rotatable sleeve 6500 is shown touching (or almost touching) the stopping surface 6620 of the second support arm 6400, one or both of which touching generally may prevent further retraction. In the fully retracted position at time t0, the rotatable sleeve 6500 may be at an angle, a0, relative to the horizon (or the ground). While FIG. 10 shows angle a0 to be approximately 13.1 degrees, any other angle may be used for a0. Circle 1000 is shown generally to identify an approximate center of rotation of the rotatable sleeve 6500 from its current resting position at time t0 upon movement of the second support arm 6400.

During extension of the second support arm 6400 from time t0 to time t1, the rotatable sleeve 6500 rotates in a clockwise direction at a rotational velocity of s1, such as shown at 1001. The movement of the second support arm 6400 by length L1 from its fully retracted position (at time t0) to a partially extended position at t1 causes the rotatable sleeve 6500 to rotate clockwise to be at an angle a1 relative to the horizon (or ground). While FIG. 10 shows angle a1 to be approximately 8.5 degrees, any other angle may be used for a1. Significantly, however, this initial movement of the second support arm 6400 from a fully retracted position (at time t0) to a partially extended position (at time t1) causes a continuous clockwise rotation of the rotatable sleeve 6500 until it reaches angle a1 at time t1. Accordingly, angle a1 is less than angle a0, confirming a clockwise rotation of the rotatable sleeve 6500 from time t0 to time t1.

During continued extension of the second support arm 6400 from time t1 to time t2, the rotatable sleeve 6500 rotates in a counter-clockwise direction at a rotational velocity of s2, such as shown at 1002. The movement of the second support arm 6400 by length L2 from its partially extended position of length L1 (at time t1) to a further extended position (or L1+L2) at t2 causes the rotatable sleeve 6500 to rotate counter-clockwise to be at an angle a2 relative to the horizon (or ground). While FIG. 10 shows angle a2 to be approximately 13.4 degrees, any other angle may be used for a2. Significantly, however, this additional movement of the second support arm 6400 from a partially extended position (L1 at time t1) to a further extended position (L1+L2 at time t1) causes a continuous counter-clockwise rotation of the rotatable sleeve 6500 until it reaches angle a2 at time t2. That is, the rotation of the rotatable sleeve 6500 between time t1 to time t2 is opposite from the rotation of the rotatable sleeve 6500 between time t0 to time t1. Accordingly, angle a2 is greater than angle a1, confirming a counter-clockwise rotation of the rotatable sleeve 6500 from time t1 to time t2.

During the remaining extension of the second support arm 6400 from time t2 to time t3, the rotatable sleeve 6500 continues rotating in a counter-clockwise direction, but does so at a rotational velocity of s3, such as shown at 1003. The movement of the second support arm 6400 by length L3 from its partially extended position of length L1+L2 (at time t2) to a fully extended position (or L1+L2+L3) at t3 causes the rotatable sleeve 6500 to rotate counter-clockwise to be at an angle a3 relative to the horizon (or ground). While FIG. 10 shows angle a3 to be approximately 29.6 degrees, any other angle may be used for a3. This additional movement of the second support arm 6400 from a partially extended position (L1+L2 at time t2) to a fully extended position (L1+L2+L3 at time t3) causes a continuous counter-clockwise rotation of the rotatable sleeve 6500 until it reaches angle a3 at time t3. The linear distance (L3) travelled by the second support arm 6400 through the rotatable sleeve 6500 during extension from time t2 to time t3 may be less than the linear distance (L2) travelled by the second support arm 6400 through the rotatable sleeve 6500 during extension from time t1 to time t2, which may be less than the linear distance (L1) travelled by the second support arm 6400 through the rotatable sleeve 6500 during extension from time t0 to time t1 (e.g., L3<L2<L1). Rotational velocity s3 may be greater than rotational velocity s2, which may be greater than rotational velocity s1. In the manner described herein, extension of a vehicle step may be performed quickly using a smooth and reliable operation. By using a rotatable sleeve in the manner described herein, a greater length of extension may be achieved relative to the space used by the assembly in a fully retracted position, thereby accommodating a wider range of vehicles and configurations.

FIG. 11 shows an example method for extension of a vehicle step using an assembly comprising a rotatable sleeve. At step 1110, a step extension operation may be initiated. An assembly (e.g., assembly 6000) may initiate the step extension. The step extension operation may be initiated by any mechanism, such as remote control, sensor, vehicle data signal (e.g., via an On-Board Diagnostics (OBD) port such as an OBD-II port, and/or via a wire tap and/or wire splice), and/or a user operation. The step extension operation may be initiated by a signal activating power to a motor or any other driving mechanism (such as motor 6200). The step extension mechanism may be initiated by rotation of a rod (such as rod 6210) coupled to one or more (e.g., two) assemblies (e.g., two assemblies of assembly 6000). Step 1110 may be initiated at time t0 in FIG. 10.

At step 1120, the assembly may extend and/or pass a first portion (e.g., L1 in FIG. 10) of a support member (e.g., the second support member 6400) through a rotatable sleeve (e.g., rotatable sleeve 6500). The rotatable sleeve may rotate in a first direction (e.g., a clockwise direction). Step 1120 may be performed between time t0 and time t1 in FIG. 10.

At step 1130, the assembly may extend and/or pass a second portion (e.g., L2 of FIG. 10, or L2+L3 of FIG. 10, or a linear distance between L2 and L2+L3) of a support member (e.g., the second support member 6400) through a rotatable sleeve (e.g., rotatable sleeve 6500). The rotatable sleeve may rotate in a second direction (e.g., a counter-clockwise direction). The second direction may be an opposite direction of the first direction. Step 1130 may be performed between time t1 and time t2 in FIG. 10, between time t2 and time t3 in FIG. 10, and/or between time t1 and time t3 in FIG. 10.

At step 1140, the assembly may stop extending and/or passing the support member through the rotatable sleeve. A step member of the assembly (e.g., a footboard) may be substantially parallel to a ground surface at the time the assembly stops the extension. Step 1140 may be performed at time t3 in FIG. 10.

FIG. 12 shows an example of a retraction of an assembly, such as the assembly 6000 shown in FIG. 6. While assembly

6000 is shown as an example, the operations with respect to FIG. 12 may apply to any assembly described herein. FIG. 12 shows four moments in time (t4, t5, t6, and t7) during a process of retracting an extendable and a retractable vehicle step comprising one or more assemblies (e.g., assembly 6000). At time t4, the assembly 6000 is fully extended. For example, the stopper 6815 of the mounting body 6100 is shown touching (or almost touching) the stopper 6810 of the first support arm 6300, which generally may prevent further extension. In the fully extended position at time t4, the rotatable sleeve 6500 is at an angle, a3, relative to the horizon (or the ground). While FIG. 12 shows angle a3 to be approximately 29.6 degrees, any other angle may be used for a3. Circle 1204 is shown generally to identify an approximate center of rotation of the rotatable sleeve 6500 from its current resting position at time t4 upon movement of the second support arm 6400.

During retraction of a second support arm 6400 from time t4 to time t5, the rotatable sleeve 6500 rotates in a clockwise direction at a rotational velocity of s5, such as shown at 1205. The movement of the second support arm 6400 by length L3 from its fully extended position (at time t4) to a partially retracted position at t5 causes the rotatable sleeve 6500 to rotate clockwise to be at an angle a2 relative to the horizon (or ground). While FIG. 12 shows angle a2 to be approximately 13.4 degrees, any other angle may be used for a2. Significantly, however, this initial movement of the second support arm 6400 from a fully extended position (at time t4) to a partially retracted position (at time t5) causes a continuous clockwise rotation of the rotatable sleeve 6500 until it reaches angle a2 at time t5. Accordingly, angle a2 is less than angle a3, confirming a clockwise rotation of the rotatable sleeve 6500 from time t4 to time t5.

During continued extension of the second support arm 6400 from time t5 to time t6, the rotatable sleeve 6500 rotates in a clockwise direction at a rotational velocity of s6, such as shown at 1206. The movement of the second support arm 6400 by length L2 from its partially retracted position of length L1+L2 (at time t5) to a further retracted position (or L1) at t6 causes the rotatable sleeve 6500 to rotate clockwise to be at an angle a1 relative to the horizon (or ground). While FIG. 12 shows angle a1 to be approximately 8.5 degrees, any other angle may be used for a1. This additional movement of the second support arm 6400 from a partially retracted position (L1+L2 at time t5) to a further retracted position (L1 at time t6) causes a continuous clockwise rotation of the rotatable sleeve 6500 until it reaches angle a1 at time t6. Angle a1 is less than angle a2, confirming a clockwise rotation of the rotatable sleeve 6500 from time t5 to time t6.

During the remaining retraction of the second support arm 6400 from time t6 to time t7, the rotatable sleeve 6500 rotates in a counter-clockwise direction at a rotational velocity of s7, such as shown at 1207. The movement of the second support arm 6400 by length L1 from its partially retracted position of length L1 (at time t6) to a fully retracted position at t7 causes the rotatable sleeve 6500 to rotate counter-clockwise to be at an angle a0 relative to the horizon (or ground). While FIG. 12 shows angle a0 to be approximately 13.1 degrees, any other angle may be used for a0. Significantly, however, this additional movement of the second support arm 6400 from a partially retracted position (L1 at time t6) to a fully retracted position (at time t7) causes a continuous counter-clockwise rotation of the rotatable sleeve 6500 until it reaches angle a3 at time t7. The linear distance (L) travelled by the second support arm 6400 through the rotatable sleeve 6500 during retraction from time t6 to time t7 may be greater than the linear distance (L2) travelled by the second support arm 6400 through the rotatable sleeve 6500 during retraction from time t5 to time t6, which may be greater than the linear distance (L3) travelled by the second support arm 6400 through the rotatable sleeve 6500 during retraction from time t4 to time t5 (e.g., L1>L2>L3). Rotational velocity s5 may be greater than rotational velocity s6, which may be greater than rotational velocity s7. In the manner described herein, retraction of a vehicle step may be performed quickly using a smooth and reliable operation. By using a rotatable sleeve in the manner described herein, a greater length of extension may be achieved relative to the space used by the assembly in a fully retracted position, thereby accommodating a wider range of vehicles and configurations.

FIG. 13 shows an example method for retraction of a vehicle step using an assembly comprising a rotatable sleeve. At step 1310, a step retraction operation may be initiated. An assembly (e.g., assembly 6000) may initiate the step retraction. The step retraction operation may be initiated by any mechanism, such as remote control, sensor, vehicle data signal (e.g., via an On-Board Diagnostics (OBD) port such as an OBD-II port, and/or via a wire tap and/or wire splice), and/or a user operation. The step retraction operation may be initiated by a signal activating power to a motor or any other driving mechanism (such as motor 6200). The step retraction mechanism may be initiated by rotation of a rod (such as rod 6210) coupled to one or more (e.g., two) assemblies (e.g., two assemblies of assembly 6000). Step 1310 may be initiated at time t4 in FIG. 12.

At step 1320, the assembly may retract and/or pass a first portion (e.g., L3 in FIG. 12, L3+L2 in FIG. 12, or a linear distance between L3 and L3+L2) of a support member (e.g., the second support member 6400) through a rotatable sleeve (e.g., rotatable sleeve 6500). The rotatable sleeve may rotate in a first direction (e.g., a clockwise direction). Step 1320 may be performed between time t4 and time t5 in FIG. 12, between time t6 and time t7 in FIG. 12, and/or between time t5 and time t7 in FIG. 12.

At step 1330, the assembly may retract and/or pass a second portion (e.g., L1 of FIG. 12) of a support member (e.g., the second support member 6400) through a rotatable sleeve (e.g., rotatable sleeve 6500). The rotatable sleeve may rotate in a second direction (e.g., a counter-clockwise direction). The second direction may be an opposite direction of the first direction. Step 1330 may be performed between time t6 and time t7 in FIG. 12.

At step 1340, the assembly may stop retracting and/or passing the support member through the rotatable sleeve. A step member of the assembly (e.g., a footboard) may be substantially underneath a vehicle chassis at the time the assembly stops the retraction. Step 1340 may be performed at time t7 in FIG. 12.

FIG. 14 shows a pair of extendable and retractable vehicle steps 1400, each of which comprises a pair of assemblies for extending and retracting the vehicle step. The pair of extendable and retractable vehicle steps 1400 may comprise a driver-side extendable and retractable vehicle step comprising two assemblies (14000-DF and 14000-DR) and a footboard 1410-D, and a passenger-side extendable and retractable vehicle step comprising two assemblies (14000-PF and 14000-PR) and a footboard 1410-P. While FIG. 14 shows assemblies 14000-PR and 14000-DR without a motor and in a configuration that may appear to be similar to assembly 9000, any assembly described herein may be used for one or both of assemblies 14000-PR and 14000-DR (e.g., with or without a motor). Similarly, while FIG. 14 shows assemblies 14000-PF and 14000-DF with a motor configured for driving a rod at point 14220-P and at point 14220-D, respectively, and in a configuration that may appear to be similar to a version of assembly 9000 but with a motor, any assembly described herein may be used for one or both of assemblies 14000-PF and 14000-DF (e.g., with or without a motor).

FIG. 15 shows an example of an angled top view of an assembly for an extendable and a retractable vehicle step, wherein the assembly comprises one or more rollers. FIG. 16 shows an example of an angled bottom view of an assembly for an extendable and a retractable vehicle step, wherein the assembly comprises one or more rollers. FIG. 17A shows an example side view of an assembly for an extendable and a retractable vehicle step, wherein the assembly comprises one or more rollers and is shown in a generally retracted position. FIG. 17B shows an example side view of an assembly for an extendable and a retractable vehicle step, wherein the assembly comprises one or more rollers and is shown in a generally extended position. An assembly 15000 is described as follows with reference to FIG. 15, FIG. 16, FIG. 17A, and FIG. 17B. Any feature of assembly 15000 may be applied to any assembly described herein. Any feature of an assembly described herein may be applied to the assembly 15000.

The assembly 15000 may operate in a similar manner as described with respect to the assembly 6000 and/or with respect to the assembly 9000, with one or more differences such as described herein. The assembly 15000 may comprise a first support arm 15300 and a second support arm 15400. The first support arm 15300 and the second support arm 15400 may operate in a manner similar to: (a) the first connecting rod 300 and the second connecting rod 400, respectively, described with respect to FIGS. 1-4; (b) the first support arm 6300 and the second support arm 6400, respectively, of the assembly 6000; and/or (c) the first support arm 9300 and the second support arm 9400, respectively, of the assembly 9000. The first support arm 15300 may be pivotably coupled to the second support arm 15400 by a joint 15310. The joint 15310 may comprise a pin and/or any other mechanism allowing rotation of each of the first support arm 15300 and the second support arm 15400 about the other. The second support arm 15400 may have a footboard mount 15600 (or footboard) at an end opposite from the joint 15310. The footboard mount may comprise one or more holes 15630 for mounting a footboard on its surface. The footboard mount 15600 (or footboard) may be angled relative to a linear direction of the second support member 15400. For example, a surface of the footboard mount 15600 (or footboard) for accommodating a person's foot when in use may be approximately 25 degrees to 60 degrees to the parallel of an elongated length of the second support member 15400. Any other angle of the footboard mount 15600 (or footboard) relative to the elongated length of the second support member 15400 may be implemented (e.g., 15 degrees, 20 degrees, . . . 30 degrees, . . . 45 degrees, etc.). The angle of the footboard mount 15600 (or footboard) relative to the elongated length of the second support member 15400 may be based on the relative proportions of the length of the first support arm 15300 and the second support arm 15400, and/or the overall lengths of the first support arm 15300 and/or the second support arm 15400.

The assembly 15000 may comprise a mounting body 15100 (such as shown in FIG. 16) and a support bracket 15110. The mounting body 15100 and the support bracket 15110 may operate in a manner similar to: (a) the mounting seat 100 and the hinge seat 110, respectively, described with respect to FIGS. 1-4; (b) the mounting body 6100 and the support bracket 6110, respectively, described with respect to the assembly 6000; and/or (c) the mounting body 9100 and the support bracket 9110, respectively, described with respect to the assembly 9000. The assembly 15000 may (optionally) comprise a frame 15140. The frame 15140 may be coupled to the mounting body 15100 and/or the support bracket 15110, such as by one or more hardware assemblies 15130. A hardware assembly 15130 may comprise one or more of a bolt, washer(s), and/or a nut. Additionally or alternatively, the frame 15140 may be coupled to the mounting body 15100 and/or the support bracket 15110 by welding and/or any other attachment mechanism. While the assembly 15000 is shown with a particular frame 15140, any other shape, size, or configuration of a frame (or none at all) may be used, for example, depending upon a vehicle manufacturer, vehicle model, mounting surface, and/or mounting area for attachment of the mounting body 15100 and/or the support bracket to a vehicle (e.g., to a chassis of a vehicle). The assembly 15000 may (optionally) comprise a motor 15200. The motor 15200 may comprise any driving mechanism used for rotating a rod 15210 (shown in-part). The rod 15210 may be coupled to the first support arm 15300, such as via a bracket of the mounting body 15100, to control rotational movement of the first support arm 15300. While not shown in FIG. 15 at such a length, the rod 15210 may extend to approximately a length of a footboard, along a side of a vehicle, to couple two (or more) assemblies of an extendable and a retractable vehicle step. The assembly 15000 may (optionally) not comprise the motor 15200. For example, a pair of assemblies 15000 may be coupled to a footboard to provide an extendable and retractable vehicle step that may be controlled by a single motor (e.g., motor 15200 coupled to one of the two assemblies 15000), whereby a first assembly 15000 that may lack a motor may be coupled to an opposite end of the rod 15210 (e.g., such as at point 15220 shown in FIG. 15) that may be powered by the motor 15200 of a second assembly 15000.

The support bracket 15110 may be configured in a fixed manner so as not to rotate. The support bracket 15110 may operate in a manner such that a rotatable sleeve (such as described with respect to the assembly 6000 and with respect to the assembly 9000) may not be required. Alternatively, the support bracket 15110 may be configured to be rotatable (e.g., at a joint (not shown) to the mounting body and/or the frame 15140) such that the support bracket 15110 may rotate about the mounting body 15100 and/or may rotate about the frame 15140. The support bracket 15110 may comprise one or more holes 15530. Hole(s) 15530 may generally be non-functional, such as being a result from machining holes for configuring one or more rollers 15760 (such as shown in FIG. 16) that may be coupled to the support bracket 15110 to facilitate movement of the second support arm 15400 through the support bracket 15110.

The mounting body 15100 may comprise at least one stopper (e.g., two or more stoppers). The mounting body 15100 may comprise a back stopper 15900 that may comprise the same material as the mounting body 15100 or that may comprise some other material such as rubber, foam, and/or any other material suitable for facilitating smooth, quiet, and reliable stopping of movement of the first support arm 15300. The back stopper 15900 may comprise a stopping surface. Additionally or alternatively, the first support arm may comprise one or more stoppers, such at the stopper 6810 and/or the stopper 6820 described with respect to the assembly 6000. The first support arm 15300 may comprise a stopping surface 15810. The frame 15140 (and/or the mounting body 15100) may comprise a stopping surface 15815. The stopping surface 15810 of the first support arm 15300 may touch the stopping surface 15815 of the frame 15140 (and/or of the mounting body 15100), for example, if the assembly 15000 operates to fully extend a vehicle step. The back stopper 15900 may touch a surface of a cavity 15910 (such as shown in FIG. 16), for example, if the assembly 15000 operates to fully retract a vehicle step. The cavity 15910 may comprise a stopping surface. One or more of back stopper 15900 and/or stopping surface 15810 may be adjusted and/or varied in thickness, for example, to accommodate different mounting areas for the assembly 15000 so as to achieve a desired retracted position of the assembly 15000 (e.g., substantially under a vehicle and/or to avoid undesired touching of other vehicle components) and/or a desired extended position of the assembly 15000 (e.g., near and/or parallel to a ground surface to facilitate a person entering and/or exiting a vehicle).

The assembly 15000 may comprise one or more rollers and one or more guide paths. As shown in FIG. 15, the assembly 15000 may comprise a top roller 15770 and a guide path 15780. As shown in FIG. 16, the assembly 15000 may comprise a bottom roller 15760 and a bottom channel 15750. The bottom roller 15760 may operate in a manner similar to the first roller 6760 and/or the second roller 6765 of the assembly 6000. The bottom channel 15750 may operate in a manner similar to the bottom channel 6750 of the assembly 6000. While the assembly 15000 is shown with a single top roller (e.g., top roller 15770) and a single bottom roller (e.g., bottom roller 15760), any quantity of top rollers may be used in the assembly 15000 and/or any quantity of bottom rollers may be used in the assembly 15000. The top roller 15770 may be configured to rotate around a joint 15775. The joint 15775 may comprise a pin and/or any other mechanism allowing rotation of top roller 15770, for example, based on movement of the second support arm 15400 through (e.g., extending and/or retracting) the support bracket 15110. As shown in FIG. 15, the joint 15775 may comprise a nut, which may be coupled to a threaded end of a bolt passing through the roller 15770 and/or passing through one or more holes of the support bracket 15110, wherein the bolt may comprise a substantially smooth surface to allow rotation of the top roller 15775. Additionally or alternatively, the joint 15775 may comprise one or more bolts, whereby a joint 15775 comprising a portion of a threaded bolt, a nut, and/or a washer, may be provided on both sides of the support bracket 15110.

The guide path 15780 may be configured to provide a surface for touching the top roller 15770 along a length of a top portion of the second support arm 15400. While shown in FIG. 15 as a raised portion of a top surface of the second support arm 15400, the guide path 15780 may be in any other configuration, such as an indented portion of the second support arm 15400 (e.g., similar to the channel 6700 of the second support arm 6400 of the assembly 6000), a plurality of raised portions (e.g., similar to top surfaces of the second support arm 6400 alongside the channel 6700), a narrower portion, and/or a wider portion (e.g., as wide as the second support arm 15400 or wider than the second support arm 15400).

The guide path 15780 may comprise a length approximately equal to a length of a portion of the second support arm 15400 that is configured to pass through the support bracket 15110, such as shown in more detail in FIG. 17A and FIG. 17B. The guide path 15780 may comprise a retraction stop portion 15781 and/or an extension stop portion 15872, such as shown in FIG. 17A and FIG. 17B.

FIG. 17A shows an example side view of the assembly 15000 in a generally retracted position. The support bracket 15110 is shown with an invisible side in order to reveal the top roller 15770 and the bottom roller 15760 from a side-view. The retraction stop portion 15781 may prevent (e.g., provide a frictional force, limit, and/or stop) movement of the second support arm 15400 beyond a fully retracted position, such as shown in FIG. 17A. The top roller 15770 may provide a force (e.g., a compression fit, radial force, etc.) against the retraction stop portion 15781 upon movement of the second support arm 15400 in a retracting direction. The force may increase as the second support arm 15400 moves toward the top roller 15770. The force may increase up to an amount sufficient to prevent further movement of the second support arm 15400 in a retracting direction. The force (e.g., an amount of force sufficient to prevent further movement of the second support arm 15400 in a retracting direction) may comprise a combination of the force of the top roller 15770 against the retraction stop portion 15781 and a force provided by the bottom roller 15760 against the underside of the second support arm 15400 (e.g., against the channel 15700 shown in FIG. 16). Additionally or alternatively, the top roller 15770, the retraction stop portion 15781, and/or the bottom roller 15760 may be configured such as to provide one or more forces against the second support arm 15400 that may be sufficient to restrict movement of the second support arm 15400 during non-use of a vehicle step in a retracted position but without stopping all movement in a retracting direction. For example, the one or more forces may prevent upward, downward, forward, backward, and/or side-to-side movement of the second support arm 15400, such as due to vibrations and/or sudden forces incurred during operation of a vehicle (e.g., engine running, vehicle driving, vehicle stopping, vehicle hitting a bump on a road, etc.), without being so great that all movement in a retracting direction is stopped by the top roller 15770, the retraction stop portion 15781, and/or the bottom roller 15760. For example, the assembly 15000 may be configured with one or more stoppers (such as described with respect to dropper 15900 and/or cavity 15910 as shown in FIG. 16) that may further restrict movement of the second support arm 15400 in a further retracted position. Additionally or alternatively, the top roller 15770, the retraction stop portion 15781, and/or the bottom roller 15760 may be configured such as to provide one or more forces against the second support arm 15400 that may be sufficient to provide smooth and/or steady movement of the second support arm 15400 from an extended position to a retracted position, for example, without experiencing significant up-and-down movement between the top roller 15770 and the bottom roller 15760 and/or without being so great that all movement in a retracting direction is stopped. Operation of the retraction stop portion 15781 (e.g., in combination with the top roller 15770 and/or the bottom roller 15760) may provide an overall smooth curve of movement of the second support arm 15400 during retraction and/or during extension for an improved operation.

FIG. 17B shows an example side view of the assembly 15000 in a generally extended position. The support bracket 15110 is shown with an invisible side in order to reveal the top roller 15770 and the bottom roller 15760 from a side-view. The extension stop portion 15782 may prevent (e.g., provide a frictional force, limit, and/or stop) movement of the second support arm 15400 beyond a fully extended position, such as shown in FIG. 17B. The top roller 15770 may provide a force (e.g., a compression fit, radial force, etc.) against the extension stop portion 15782 upon movement of the second support arm 15400 in an extending direction. The force may increase as the second support arm 15400 moves toward the top roller 15770. The force may increase up to an amount sufficient to prevent further movement of the second support arm 15400 in an extending direction. The force (e.g., an amount of force sufficient to prevent further movement of the second support arm 15400 in an extending direction) may comprise a combination of the force of the top roller 15770 against the extension stop portion 15782 and a force provided by the bottom roller 15760 against the underside of the second support arm 15400 (e.g., against the channel 15700 shown in FIG. 16). Additionally or alternatively, the top roller 15770, the extension stop portion 15782, and/or the bottom roller 15760 may be configured such as to provide one or more forces against the second support arm 15400 that may be sufficient to restrict movement of the second support arm 15400 during use of a vehicle step in an extended position but without stopping all movement in an extending direction. For example, the one or more forces may prevent upward, downward, forward, backward, and/or side-to-side movement of the second support arm 15400, such as due to vibrations and/or sudden forces incurred during operation of a vehicle step (e.g., person stepping onto and/or off of a vehicle step), without being so great that all movement in an extending direction is stopped by the top roller 15770, the extension stop portion 15782, and/or the bottom roller 15760. For example, the assembly 15000 may be configured with one or more stoppers (such as described with respect to stopping surface 15810 and/or stopping surface 15815 as shown in FIG. 15) that may further restrict movement of the second support arm 15400 in a further extended position. Additionally or alternatively, the top roller 15770, the extension stop portion 15782, and/or the bottom roller 15760 may be configured such as to provide one or more forces against the second support arm 15400 that may be sufficient to provide smooth and/or steady movement of the second support arm 15400 from a retracted position to an extended position, for example, without experiencing significant up-and-down movement between the top roller 15770 and the bottom roller 15760 and/or without being so great that all movement in an extending direction is stopped. Operation of the extension stop portion 15782 (e.g., in combination with the top roller 15770 and/or the bottom roller 15760) may provide an overall smooth curve of movement of the second support arm 15400 during retraction and/or during extension for an improved operation.

The bottom roller 15760 may be configured to rotate around a joint 15765. The joint 15765 may be located through the bottom roller 15760, on the support bracket 15110, underneath the bottom channel 15750. The joint 15765 may be located in the support bracket 15110 along a same axis as the hole 15530 (e.g., which may be machined to provide a hole for the joint 15765). The joint 15765 may comprise a pin and/or any other mechanism allowing rotation of bottom roller 15760, for example, based on movement of the second support arm 15400 through (e.g., extending and/or retracting) the support bracket 15110. The joint 15765 may comprise a nut, which may be coupled to a threaded end of a bolt passing through the bottom roller 15760, wherein the bolt may comprise a substantially smooth surface to allow rotation of the bottom roller 15760. Additionally or alternatively, the joint 15765 may comprise one or more bolts, whereby a joint 15765 comprising a portion of a threaded bolt, a nut, and/or a washer, may be provided on both sides of the bottom roller 15760.

The top roller 15770, the bottom roller 15760, the bottom channel 15750, the guide path 15780, the retraction stop portion 15781 of the guide path 15780, and/or the extension stop portion 15782 of the guide path 15780 may operate to maintain alignment (e.g., prevent/reduce sideways movement) of the second support arm 15400, for example, as the second support arm 15400 passes through the support bracket 15110. The top roller 15770, the bottom roller 15760, the bottom channel 15750, the guide path 15780, the retraction stop portion 15781 of the guide path 15780, and/or the extension stop portion 15782 of the guide path 15780 may provide for extension and/or retraction of a vehicle step in a smooth and/or steady manner, that may improve overall performance of an extendable and a retractable vehicle step.

An extension procedure may comprise movement of the assembly 15000 from the position shown in FIG. 17A (e.g., fully retracted) to the position shown in FIG. 17B (e.g., fully extended). The extension procedure for the assembly 15000 may comprise one or more operations and/or steps described with respect to FIG. 10 and/or FIG. 11, for example, if the support bracket 15110 is configured to be rotatable (similar to the rotatable sleeve 6500). Additionally or alternatively, the extension procedure for the assembly 15000 may comprise one or more operations and/or steps described with respect to FIG. 10 and/or FIG. 11, whereby the support bracket 15110 does not rotate but the first support arm 15300 and the second support arm 15400 of the assembly 15000 move and/or operate in a manner similar to the first support arm 6300 and the second support arm 6400 of the assembly 6000. For example, the second support arm 15400 may extend at lengths L1, L2, and/or L3 (e.g., through the support bracket 15110) relative to angles of rotation of the second support arm 15400 of angles: (a0-a1) in a clockwise direction, (a2-a1) in a counterclockwise direction, and/or (a3-a2) in a counterclockwise direction, respectively, such as shown in FIG. 10. As another example, the second support arm 15400 may extend through the support bracket 15110 while the second support arm 15400 rotates in a first (e.g., counterclockwise) direction (such as in step 1120 of FIG. 11), and/or may continue to extend through the support bracket 15110 while the second support arm 15400 rotates in a second (e.g., clockwise) direction (such as in step 1130 of FIG. 11). The assembly 15000 may initiate the extension procedure at a position as shown in FIG. 17A (such as in step 1110 of FIG. 11). The assembly 15000 may stop extending the second support arm 15400, which may stop the extension procedure, at a position as shown in FIG. 17B (such as in step 1140 of FIG. 11). A step member may be substantially parallel to a ground surface at the end of the extension procedure.

A retraction procedure may comprise movement of the assembly 15000 from the position shown in FIG. 17B (e.g., fully extended) to the position shown in FIG. 17A (e.g., fully retracted). The retraction procedure for the assembly 15000 may comprise one or more operations and/or steps described with respect to FIG. 12 and/or FIG. 13, for example, if the support bracket 15110 is configured to be rotatable (similar to the rotatable sleeve 6500). Additionally or alternatively, the extension procedure for the assembly 15000 may comprise one or more operations and/or steps described with respect to FIG. 12 and/or FIG. 13, whereby the support bracket 15110 does not rotate but the first support arm 15300 and the second support arm 15400 of the assembly 15000 move and/or operate in a manner similar to the first support arm 6300 and the second support arm 6400 of the assembly 6000. For example, the second support arm 15400 may retract at lengths L3, L2, and/or L1 (e.g., through the support bracket 15110) relative to angles of rotation of the second support arm 15400 of angles: (a3-a2) in a clockwise direction, (a2-a1) in a clockwise direction, and/or (a0-a1) in a counterclockwise direction, respectively, such as shown in FIG. 12. As another example, the second support arm 15400 may retract through the support bracket 15110 while the second support arm 15400 rotates in a first (e.g., counterclockwise) direction (such as in step 1320 of FIG. 13), and/or may continue to extend through the support bracket 15110 while the second support arm 15400 rotates in a second (e.g., clockwise) direction (such as in step 1330 of FIG. 13). The assembly 15000 may initiate the retraction procedure at a position as shown in FIG. 17B (such as in step 1310 of FIG. 13). The assembly 15000 may stop retracting the second support arm 15400, which may stop the retraction procedure, at a position as shown in FIG. 17A (such as in step 1340 of FIG. 13). A step member (e.g., a footboard and/or a support arm) may be substantially under a vehicle chassis at the end of the extension procedure.

FIG. 18A shows an example of an assembly for an extendable and a retractable vehicle step, wherein the assembly comprises one or more rollers and may be configured for location generally near a passenger-side front door area of a vehicle. An assembly 15000-PF may be similar to the assembly 15000 that may be configured for a passenger-side front door area of a vehicle. The assembly 15000-PF may comprise a motor 15200-P that may be similar to the motor 15200 of the assembly 15000 and/or that may be configured for a passenger-side front door area of a vehicle. The assembly 15000-PF may (optionally) comprise a frame 15140-PF. The frame 15140-PF may be similar to the frame 15140 that may be configured for a passenger-side front door area of a vehicle. Any other shape, size, or configuration of a frame (or none at all) may be used, for example, depending upon a vehicle manufacturer, vehicle model, mounting surface, and/or mounting area for attachment of the assembly 15000-PF to a vehicle (e.g., to a chassis of a vehicle).

FIG. 18B shows an example of an assembly for an extendable and a retractable vehicle step, wherein the assembly comprises one or more rollers and may be configured for location generally near a passenger-side rear door area of a vehicle. An assembly 15000-PR may be similar to the assembly 15000 that may be configured for a passenger-side rear door area of a vehicle. The assembly 15000-PR may (optionally) comprise a frame 15140-PR. The frame 15140-PR may be similar to the frame 15140 that may be configured for a passenger-side rear door area of a vehicle. Any other shape, size, or configuration of a frame (or none at all) may be used, for example, depending upon a vehicle manufacturer, vehicle model, mounting surface, and/or mounting area for attachment of the assembly 15000-PR to a vehicle (e.g., to a chassis of a vehicle).

FIG. 18C shows an example of an assembly for an extendable and a retractable vehicle step, wherein the assembly comprises one or more rollers and may be configured for location generally near a driver-side front door area of a vehicle. An assembly 15000-DF may be similar to the assembly 15000 that may be configured for a driver-side front door area of a vehicle. The assembly 15000-DF may comprise a motor 15200-D that may be similar to the motor 15200 of the assembly 15000 and/or that may be configured for a driver-side front door area of a vehicle. The assembly 15000-DF may (optionally) comprise a frame 15140-DF. The frame 15140-DF may be similar to the frame 15140 that may be configured for a driver-side front door area of a vehicle. Any other shape, size, or configuration of a frame (or none at all) may be used, for example, depending upon a vehicle manufacturer, vehicle model, mounting surface, and/or mounting area for attachment of the assembly 15000-DF to a vehicle (e.g., to a chassis of a vehicle).

FIG. 18D shows an example of an assembly for an extendable and a retractable vehicle step, wherein the assembly comprises one or more rollers and may be configured for location generally near a driver-side rear door area of a vehicle. An assembly 15000-DR may be similar to the assembly 15000 that may be configured for a driver-side rear door area of a vehicle. The assembly 15000-DR may (optionally) comprise a frame 15140-DR. The frame 15140-DR may be similar to the frame 15140 that may be configured for a driver-side rear door area of a vehicle. Any other shape, size, or configuration of a frame (or none at all) may be used, for example, depending upon a vehicle manufacturer, vehicle model, mounting surface, and/or mounting area for attachment of the assembly 15000-DR to a vehicle (e.g., to a chassis of a vehicle).

FIG. 19 shows an example of an assembly for an extendable and a retractable vehicle step being coupled to a footboard. As an example, the assembly may comprise the assembly 15000 (e.g., comprising the second support arm 15400 and the support bracket 15110), although any other assembly described herein may used. The assembly may be coupled to a footboard 1910 at a footboard mount (e.g., the footboard mount 15600). The assembly may be coupled to the footboard 1910 using one or more mounting hardware 1920, such as one or more nuts, bolts, and/or washers. Additionally or alternatively, the footboard 1910 may be coupled to the assembly by any other attachment mechanism (e.g., removable such as clips and/or pins, and/or non-removable such as welding and/or glue).

FIG. 20 shows a pair of extendable and retractable vehicle steps 2000, each of which comprises a pair of assemblies for extending and retracting the vehicle step. The pair of extendable and retractable vehicle steps 2000 may comprise a driver-side extendable and retractable vehicle step comprising two assemblies (20000-DF and 20000-DR) and a footboard 2010-D, and a passenger-side extendable and retractable vehicle step comprising two assemblies (20000-PF and 20000-PR) and a footboard 2010-P. While FIG. 20 shows assemblies 20000-PR and 20000-DR without a motor and in a configuration that may appear to be similar to assembly 15000, any assembly described herein may be used for one or both of assemblies 20000-PR and 20000-DR (e.g., with or without a motor). Similarly, while FIG. 20 shows assemblies 20000-PF and 20000-DF with a motor configured for driving a rod at point 20220-P and at point 20220-D, respectively, and in a configuration that may appear to be similar to a version of assembly 15000, any assembly described herein may be used for one or both of assemblies 20000-PF and 20000-DF (e.g., with or without a motor). In an example, the pair of extendable and retractable vehicle steps 2000 may comprise the assemblies 15000-PF, 15000-PR, 15000-DF, and 15000-DR described with respect to FIG. 18A, FIG. 18B, FIG. 18C, and FIG. 18D, respectively.

A rocker footboard device (e.g., such as described herein with respect to FIGS. 1, 2, 3, and/or 4) may comprise: a mounting seat, a rotary driving device arranged on the mounting seat, a first connecting rod, a second connecting rod, a sliding sleeve, and a footboard. The rotary driving device may be provided with a driving shaft. The first connecting rod may comprise a first end fixedly connected with the driving shaft, and a second end pivotally connected with a first end of the second connecting rod through a first pivot shaft. The footboard may be provided at a second end of the second connecting rod. The sliding sleeve may be pivotally connected with the mounting seat through a second pivot shaft. A middle segment of the second connecting rod may be slidably provided on the sliding sleeve. The rotary driving device may drive the first connecting rod to rotate around the driving shaft. The first connecting rod may drive the second connecting rod to slide in the sliding sleeve. The second connecting rod may be extended and/or retracted, thereby extending and/or retracting the footboard. Compared with a four-rod linkage mechanism, a rocker footboard device as described herein may have advantages such as a simpler structure, smaller size, lower manufacturing cost, and/or higher production efficiency. An axis of the driving shaft, an axis of the first pivot shaft, and an axis of the second pivot shaft may be parallel to one another. A distance between the axis of the driving shaft and the axis of the first pivot shaft may be a first distance; a distance between the axis of the driving shaft and the axis of the second pivot shaft may be a second distance; and the first distance may be less than the second distance. The rotary driving device may be provided at an underside of the mounting seat. The underside of the mounting seat may be provided with a hinge seat. The second pivot shaft may be pivotally connected on the hinge seat. The driving shaft may be higher than the second pivot shaft. The rocker footboard device may further comprise: a stop block that may be located between the driving shaft and the second pivot shaft. An upper end of the stop block may be connected with the mounting seat. A lower side of the stop block may be provided with an abutting portion abutting against the second connecting rod. The abutting portion may be provided with an abutting surface abutting against the second connecting rod. The abutting surface may be matched with an outer side of the second connecting rod in shape. When the second connecting rod abuts against the abutting surface, the second end of the second connecting rod may be extended, and an upper side of the footboard may be maintained in a horizontal position. The mounting seat may be provided with a plurality of mounting holes. The second end of the second connecting rod may be provided with a bending portion which bends upward, and the footboard may be provided on the bending portion. The second end of the second connecting rod may be provided with a bending portion which bends upward, and the footboard may be provided on the bending portion. A friction texture may be provided at the upper side of the footboard. A vehicle may comprise: a vehicle body, and the rocker footboard device according to the above description, wherein the vehicle body may be provided with a chassis. The mounting seat may be provided at a bottom of the chassis. The rotary driving device, the first connecting rod, and the second connecting rod may be located under the chassis.

A retractable and/or extendable vehicle step such as described herein may comprise: a mounting body; a first support arm comprising a first end and a second end, wherein the first end of the first support arm is pivotally coupled to the mounting body; a second support arm comprising a first end and a second end, wherein the first end of the second support arm is pivotably coupled to the second end of the first support arm, and wherein the second end of the second support arm comprises a mounting portion for a footboard; and a rotatable sleeve through which at least a portion of the second support arm is configured to pass in a first direction during an extension operation and in a second direction during a retraction operation. The rotatable sleeve may comprise at least one roller that is configured to: rotate clockwise, based on movement of the second support arm in the first direction; and rotate counterclockwise, based on movement of the second support arm in the second direction. The second support arm comprises a cavity that may be configured to touch the at least one roller to facilitate the movement of the second support arm in the first direction and the movement of the second support arm in the second direction. The rotatable sleeve may be configured to: rotate clockwise, based on movement of the second support arm of a first length in the first direction; and after the movement of the second support arm of the first length in the first direction, rotate counterclockwise, based on movement of the second support arm of a second length in the first direction. The rotatable sleeve further may comprise at least one guide pin. The second support arm may comprise a channel configured to receive at least a portion of the guide pin to facilitate movement of the second support arm in the first direction and movement of the second support arm in the second direction. The rotatable sleeve may comprise at least one channel. The second support arm may comprise a channel guide to fit within a width of the at least one channel to facilitate movement of the second support arm in the first direction and movement of the second support arm in the second direction. The mounting body may comprise a first stopper. A side of the first support arm may comprise a second stopper configured to touch the first stopper at one of: a fully retracted position of the extendable and retractable vehicle step assembly; or a fully extended position of the extendable and retractable vehicle step assembly. The extendable and retractable vehicle step assembly may comprise: a support bracket coupled to the rotatable sleeve. A first side of the support bracket may be pivotably coupled to a first outer side of the rotatable sleeve. A second side of the support bracket may be pivotably coupled to a second outer side of the rotatable sleeve. The extendable and retractable vehicle step assembly may comprise a motor configured to rotate the first support arm about a point at the first end of the first support arm that is pivotably coupled to the mounting body. The mounting body, the first support arm, the second support arm, and the rotatable sleeve may comprise a first assembly portion. The extendable and retractable vehicle step assembly may further comprise: a second assembly portion comprising a duplicate of the mounting body, the first support arm, the second support arm, and the rotatable sleeve; a rod, coupled to the motor, and configured to simultaneously rotate: the first support arm of the first assembly portion, and the duplicate of the first support arm of the second assembly portion; and a footboard comprising a first portion and a second portion, wherein the first portion of the footboard may be coupled to the second support arm of the first assembly portion, and wherein the second portion of the footboard may be coupled to the duplicate of the second support arm of the second assembly portion.

An extendable and retractable vehicle step assembly may comprise: a mounting body; a first support arm comprising a first end and a second end, wherein the first end of the first support arm is pivotably coupled to the mounting body; a second support arm comprising a first end and a second end, wherein the first end of the second support arm is pivotably coupled to the second end of the first support arm, and wherein the second end of the second support arm comprises a mounting portion for a footboard; a sleeve through which at least a portion of the second support arm is configured to pass in a first direction during an extension operation and in a second direction during a retraction operation; and at least one roller that is configured to: rotate clockwise, based on movement of the second support arm in the first direction; and rotate counterclockwise, based on movement of the second support arm in the second direction. The sleeve may comprise a non-rotatable sleeve. The second support arm may comprise a guide path on a top surface of the second support arm. The guide path may be configured to touch the at least one roller during the movement of the second support arm in the first direction and during the movement of the second support arm in the second direction. The guide path may comprise: an extension stop portion at a second end of the guide path. The extension stop portion may be configured to generate a force against the at least one roller to limit the movement of the second support arm in the first direction. The guide path may comprise a retraction stop portion at a first end of the guide path. The retraction stop portion may be configured to generate a force against the at least one roller to limit the movement of the second support arm in the second direction. The at least one roller may comprise a top roller. The second support arm may comprise a cavity configured to touch a bottom roller to facilitate the movement of the second support arm in the first direction and the movement of the second support arm in the second direction. The mounting body may comprise a first stopping surface. A side of the first support arm may comprise a second stopping surface configured to touch the first stopping surface at one of: a fully retracted position of the extendable and retractable vehicle step assembly; or a fully extended position of the extendable and retractable vehicle step assembly. The assembly may comprise a motor configured to rotate the first support arm about a point at the first end of the first support arm that is pivotably coupled to the mounting body.

An extendable and retractable vehicle step may comprise: a footboard; a first assembly; a second assembly; a motor coupled to at least one of the first assembly or the second assembly; and a rod coupled to the motor. The first assembly may comprise: a first mounting body; a first support arm comprising a first end and a second end, wherein the first end of the first support arm may be pivotably coupled to the first mounting body; a second support arm comprising a first end and a second end, wherein the first end of the second support arm may be pivotably coupled to the second end of the first support arm and wherein the second end of the second support arm may comprise a mounting portion for the footboard; and a first sleeve through which at least a portion of the second support arm may be configured to pass in a first direction during an extension operation and in a second direction during a retraction operation. The second assembly may comprise: a second mounting body; a third support arm comprising a first end and a second end, wherein the first end of the third support arm may be pivotably coupled to the second mounting body; a fourth support arm comprising a first end and a second end, wherein the first end of the fourth support arm may be pivotably coupled to the second end of the third support arm and wherein the second end of the fourth support arm may comprise a mounting portion for the footboard; and a second sleeve through which at least a portion of the fourth support arm may be configured to pass in the first direction during the extension operation and in the second direction during the retraction operation; The rod may be configured to simultaneously rotate the first support arm and the third support arm during the extension operation and during the retraction operation. The first sleeve may be configured to: rotate clockwise, based on movement of the second support arm of a first length in the first direction; and after the movement of the second support arm of the first length in the first direction, rotate counterclockwise, based on movement of the second support arm of a second length in the first direction. The second sleeve may be configured to: rotate clockwise, based on movement of the fourth support arm of the first length in the first direction; and after the movement of the fourth support arm of the first length in the first direction, rotate counterclockwise, based on movement of the fourth support arm of the second length in the first direction. The first sleeve may comprise at least one first roller that may be configured to: rotate clockwise, based on movement of the second support arm in the first direction; and rotate counterclockwise, based on movement of the second support arm in the second direction. The second sleeve may comprise at least one second roller that may be configured to: rotate clockwise, based on movement of the fourth support arm in the first direction; and rotate counterclockwise, based on movement of the fourth support arm in the second direction.

The above are only preferred implementations of the present disclosure. It should be noted that several improvements and replacements may further be made by those of ordinary skill in the art without departing from the technical principle of the present disclosure, and such improvements and replacements should also be deemed as falling within the protection scope of the present disclosure. Aspects of the disclosure have been described in terms of example embodiments. Other embodiments, modifications, and/or variations within the scope and spirit of the appended claims will be evident to persons of ordinary skill in the art. For example, one or more of the steps depicted in the example figures may be performed in a different order, one or more steps described with respect to one figure may be used in combination with one or more steps described with respect to another figure, and/or one or more described steps may be optional.

What is claimed is:

1. An extendable and retractable vehicle step assembly comprising:
    a mounting body;
    a first support arm comprising a first end and a second end, wherein the first end of the first support arm is pivotably coupled to the mounting body;
    a second support arm comprising a first end and a second end, wherein the first end of the second support arm is pivotably coupled to the second end of the first support arm, and wherein the second end of the second support arm comprises a mounting portion for a footboard; and
    a rotatable sleeve through which at least a portion of the second support arm is configured to pass in a first direction during an extension operation and in a second direction during a retraction operation, wherein the rotatable sleeve comprises at least one roller that is configured to:
    rotate clockwise, based on movement of the second support arm in the first direction; and
    rotate counterclockwise, based on movement of the second support arm in the second direction.

2. The extendable and retractable vehicle step assembly of claim 1, wherein the second support arm comprises a cavity configured to touch the at least one roller to facilitate the movement of the second support arm in the first direction and the movement of the second support arm in the second direction.

3. The extendable and retractable vehicle step assembly of claim 1, wherein the rotatable sleeve further comprises at least one guide pin, and wherein the second support arm further comprises a channel configured to receive at least a portion of the guide pin to facilitate movement of the second support arm in the first direction and movement of the second support arm in the second direction.

4. The extendable and retractable vehicle step assembly of claim 1, wherein the rotatable sleeve further comprises at least one channel, and wherein the second support arm further comprises a channel guide to fit within a width of the at least one channel to facilitate movement of the second support arm in the first direction and movement of the second support arm in the second direction.

5. The extendable and retractable vehicle step assembly of claim 1, wherein the mounting body comprises a first stopper, and wherein a side of the first support arm comprises a second stopper configured to touch the first stopper at one of:
- a fully retracted position of the extendable and retractable vehicle step assembly; or
- a fully extended position of the extendable and retractable vehicle step assembly.

6. The extendable and retractable vehicle step assembly of claim 1, further comprising:
- a support bracket coupled to the rotatable sleeve, wherein a first side of the support bracket is pivotably coupled to a first outer side of the rotatable sleeve, and wherein a second side of the support bracket is pivotably coupled to a second outer side of the rotatable sleeve.

7. The extendable and retractable vehicle step assembly of claim 1, wherein the assembly further comprises:
- a motor configured to rotate the first support arm about a point at the first end of the first support arm that is pivotably coupled to the mounting body.

8. The extendable and retractable vehicle step assembly of claim 7, wherein the mounting body, the first support arm, the second support arm, and the rotatable sleeve comprise a first assembly portion, and wherein the extendable and retractable vehicle step assembly further comprises:
- a second assembly portion comprising a duplicate of the mounting body, the first support arm, the second support arm, and the rotatable sleeve;
- a rod, coupled to the motor, and configured to simultaneously rotate:
  - the first support arm of the first assembly portion; and
  - the duplicate of the first support arm of the second assembly portion; and
- a footboard comprising a first portion and a second portion, wherein the first portion of the footboard is coupled to the second support arm of the first assembly portion, and wherein the second portion of the footboard is coupled to the duplicate of the second support arm of the second assembly portion.

9. An extendable and retractable vehicle step assembly comprising:
- a mounting body;
- a first support arm comprising a first end and a second end, wherein the first end of the first support arm is pivotably coupled to the mounting body;
- a second support arm comprising a first end and a second end, wherein the first end of the second support arm is pivotably coupled to the second end of the first support arm, and wherein the second end of the second support arm comprises a mounting portion for a footboard; and
- a rotatable sleeve through which at least a portion of the second support arm is configured to pass in a first direction during an extension operation and in a second direction during a retraction operation, wherein the rotatable sleeve is configured to:
  - rotate clockwise, based on movement of the second support arm of a first length in the first direction; and
  - after the movement of the second support arm of the first length in the first direction, rotate counterclockwise, based on movement of the second support arm of a second length in the first direction.

10. The extendable and retractable vehicle step assembly of claim 9, wherein the second support arm comprises a cavity configured to touch at least one roller to facilitate the movement of the second support arm in the first direction and the movement of the second support arm in the second direction.

11. The extendable and retractable vehicle step assembly of claim 9, wherein the rotatable sleeve further comprises at least one guide pin, and wherein the second support arm further comprises a channel configured to receive at least a portion of the guide pin to facilitate movement of the second support arm in the first direction and movement of the second support arm in the second direction.

12. The extendable and retractable vehicle step assembly of claim 9, wherein the rotatable sleeve further comprises at least one channel, and wherein the second support arm further comprises a channel guide to fit within a width of the at least one channel to facilitate movement of the second support arm in the first direction and movement of the second support arm in the second direction.

13. The extendable and retractable vehicle step assembly of claim 9, wherein the mounting body comprises a first stopper, and wherein a side of the first support arm comprises a second stopper configured to touch the first stopper at one of:
- a fully retracted position of the extendable and retractable vehicle step assembly; or
- a fully extended position of the extendable and retractable vehicle step assembly.

14. The extendable and retractable vehicle step assembly of claim 9, further comprising:
- a support bracket coupled to the rotatable sleeve, wherein a first side of the support bracket is pivotably coupled to a first outer side of the rotatable sleeve, and wherein a second side of the support bracket is pivotably coupled to a second outer side of the rotatable sleeve.

15. The extendable and retractable vehicle step assembly of claim 9, wherein the assembly further comprises:
- a motor configured to rotate the first support arm about a point at the first end of the first support arm that is pivotably coupled to the mounting body.

16. The extendable and retractable vehicle step assembly of claim 15, wherein the mounting body, the first support arm, the second support arm, and the rotatable sleeve comprise a first assembly portion, and wherein the extendable and retractable vehicle step assembly further comprises:
- a second assembly portion comprising a duplicate of the mounting body, the first support arm, the second support arm, and the rotatable sleeve;
- a rod, coupled to the motor, and configured to simultaneously rotate:
  - the first support arm of the first assembly portion; and
  - the duplicate of the first support arm of the second assembly portion; and
- a footboard comprising a first portion and a second portion, wherein the first portion of the footboard is coupled to the second support arm of the first assembly portion, and wherein the second portion of the footboard is coupled to the duplicate of the second support arm of the second assembly portion.

17. An extendable and retractable vehicle step assembly comprising:
- a mounting body, wherein the mounting body comprises a first stopping surface;

a first support arm comprising a first end and a second end, wherein the first end of the first support arm is pivotably coupled to the mounting body, and wherein a side of the first support arm comprises a second stopping surface configured to touch the first stopping surface at one of:
   a fully retracted position of the extendable and retractable vehicle step assembly; or
   a fully extended position of the extendable and retractable vehicle step assembly;
a second support arm comprising a first end and a second end, wherein the first end of the second support arm is pivotably coupled to the second end of the first support arm, and wherein the second end of the second support arm comprises a mounting portion for a footboard;
a sleeve through which at least a portion of the second support arm is configured to pass in a first direction during an extension operation and in a second direction during a retraction operation; and
at least one roller that is configured to:
   rotate clockwise, based on movement of the second support arm in the first direction; and
   rotate counterclockwise, based on movement of the second support arm in the second direction.

18. The extendable and retractable vehicle step assembly of claim 17, wherein the sleeve comprises a non-rotatable sleeve.

19. The extendable and retractable vehicle step assembly of claim 17, wherein the second support arm comprises a guide path on a top surface of the second support arm, wherein the guide path is configured to touch the at least one roller during the movement of the second support arm in the first direction and during the movement of the second support arm in the second direction.

20. The extendable and retractable vehicle step assembly of claim 19, wherein the guide path comprises:
   an extension stop portion at a second end of the guide path, wherein the extension stop portion is configured to generate a force against the at least one roller to limit the movement of the second support arm in the first direction; and
   a retraction stop portion at a first end of the guide path, wherein the retraction stop portion is configured to generate a force against the at least one roller to limit the movement of the second support arm in the second direction.

21. The extendable and retractable vehicle step assembly of claim 17, wherein the at least one roller comprises a top roller, and wherein the second support arm comprises a cavity configured to touch a bottom roller to facilitate the movement of the second support arm in the first direction and the movement of the second support arm in the second direction.

22. The extendable and retractable vehicle step assembly of claim 17, wherein the assembly further comprises:
   a motor configured to rotate the first support arm about a point at the first end of the first support arm that is pivotably coupled to the mounting body.

23. An extendable and retractable vehicle step comprising:
   a footboard;
   a first assembly comprising:
      a first mounting body;
      a first support arm comprising a first end and a second end, wherein the first end of the first support arm is pivotably coupled to the first mounting body;
      a second support arm comprising a first end and a second end, wherein the first end of the second support arm is pivotably coupled to the second end of the first support arm and wherein the second end of the second support arm comprises a mounting portion for the footboard; and
      a first sleeve through which at least a portion of the second support arm is configured to pass in a first direction during an extension operation and in a second direction during a retraction operation, wherein the first sleeve comprises at least one first roller that is configured to:
         rotate clockwise, based on movement of the second support arm in the first direction; and
         rotate counterclockwise, based on movement of the second support arm in the second direction;
   a second assembly comprising:
      a second mounting body;
      a third support arm comprising a first end and a second end, wherein the first end of the third support arm is pivotably coupled to the second mounting body;
      a fourth support arm comprising a first end and a second end, wherein the first end of the fourth support arm is pivotably coupled to the second end of the third support arm and wherein the second end of the fourth support arm comprises a mounting portion for the footboard; and
      a second sleeve through which at least a portion of the fourth support arm is configured to pass in the first direction during the extension operation and in the second direction during the retraction operation, wherein the second sleeve comprises at least one second roller that is configured to:
         rotate clockwise, based on movement of the fourth support arm in the first direction; and
         rotate counterclockwise, based on movement of the fourth support arm in the second direction;
   a motor coupled to at least one of the first assembly or the second assembly; and
   a rod coupled to the motor and configured to simultaneously rotate the first support arm and the third support arm during the extension operation and during the retraction operation.

24. The extendable and retractable vehicle step of claim 23, wherein:
   the first sleeve is configured to:
      rotate clockwise, based on movement of the second support arm of a first length in the first direction; and
      after the movement of the second support arm of the first length in the first direction, rotate counterclockwise, based on movement of the second support arm of a second length in the first direction; and
   the second sleeve is configured to:
      rotate clockwise, based on movement of the fourth support arm of the first length in the first direction; and
      after the movement of the fourth support arm of the first length in the first direction, rotate counterclockwise, based on movement of the fourth support arm of the second length in the first direction.

25. The extendable and retractable vehicle step of claim 23, wherein the sleeve comprises a non-rotatable sleeve.

26. The extendable and retractable vehicle step of claim 23, wherein the second support arm comprises a guide path on a top surface of the second support arm, wherein the guide path is configured to touch the at least one first roller during the movement of the second support arm in the first direction and during the movement of the second support arm in the second direction.

27. The extendable and retractable vehicle step of claim 26, wherein the guide path comprises:
   an extension stop portion at a second end of the guide path, wherein the extension stop portion is configured to generate a force against the at least one first roller to limit the movement of the second support arm in the first direction; and
   a retraction stop portion at a first end of the guide path, wherein the retraction stop portion is configured to generate a force against the at least one first roller to limit the movement of the second support arm in the second direction.

28. The extendable and retractable vehicle step of claim 23, wherein the at least one first roller comprises a top roller, and wherein the second support arm comprises a cavity configured to touch a bottom roller to facilitate the movement of the second support arm in the first direction and the movement of the second support arm in the second direction.

* * * * *